(12) United States Patent
Wellbrock et al.

(10) Patent No.: US 8,649,683 B2
(45) Date of Patent: Feb. 11, 2014

(54) LIGHT PATH CHARACTERIZATION, TRAFFIC PROTECTION, AND WAVELENGTH DEFRAGMENTATION

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 258 days.

(21) Appl. No.: 13/160,828

(22) Filed: Jun. 15, 2011

(65) Prior Publication Data
US 2012/0321296 A1 Dec. 20, 2012

(51) Int. Cl.
*H04J 14/02* (2006.01)
(52) U.S. Cl.
CPC .................................. *H04J 14/0212* (2013.01)
USPC ................................................. 398/83; 398/3
(58) Field of Classification Search
USPC .............................. 398/2–5, 9, 16, 17, 82, 83
See application file for complete search history.

(56) References Cited

U.S. PATENT DOCUMENTS

| | | | |
|---|---|---|---|
| 6,657,952 B1 * | 12/2003 | Shimomura et al. | 370/223 |
| 7,356,258 B1 * | 4/2008 | Weverka et al. | 398/59 |
| 8,447,183 B2 * | 5/2013 | Boduch et al. | 398/83 |
| 2009/0232497 A1 * | 9/2009 | Archambault et al. | 398/50 |
| 2011/0274425 A1 * | 11/2011 | Grobe | 398/3 |
| 2012/0213523 A1 * | 8/2012 | Ji et al. | 398/83 |

* cited by examiner

*Primary Examiner* — Dalzid Singh

(57) ABSTRACT

A method for managing an optical network having a plurality of nodes interconnected by a plurality of fiber links includes installing one or more active reconfigurable optical add/drop multiplexer (ROADM) cards into a node and installing a spare ROADM card into the node. The one or more active ROADM cards are configured to pass optical traffic to and from the optical network. The installed spare ROADM card is remotely activated to pass optical traffic to and from the optical network, subsequent to configuring the one or more active ROADM cards, based on one of: an event or expiration of a time period.

22 Claims, 22 Drawing Sheets

US 8,649,683 B2

LIGHT PATH CHARACTERIZATION, TRAFFIC PROTECTION, AND WAVELENGTH DEFRAGMENTATION

BACKGROUND

Routing video, data, and voice traffic at high bit rates via Ultra Long Haul (ULH) or Metro optical networks is substantially increasing in modern communications systems. Some variants of such systems transmit optical signals through optical fibers via dense wavelength division multiplexing (DWDM), in which multiple wavelengths of light are transmitted simultaneously through a single fiber. DWDM systems typically employ devices called reconfigurable optical add/drop multiplexers (ROADMs) to add and remove signals from the network in a purely optical manner, without requiring conversion to/from the electrical domain.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The following detailed description refers to the accompanying drawings. The same reference numbers in different drawings may identify the same or similar elements. Also, the following detailed description does not limit the invention.

Embodiments described herein relate to providing a robust and dynamic optical network environment. More specifically, a reconfigurable optical add/drop multiplexer (ROADM) in a mesh optical network may be configured to include an installed spare card, not initially associated with a particular channel being added or dropped from the network. The installed spare card may be remotely configured to enable a number of features, including pre-testing of a new light paths in the network without requiring de-provisioning of any active channels, defragmenting wavelengths in the network by allowing re-arranging of the light paths for the various channels in the network, providing a back-up path for use in the event of link or card failure, and monitoring long term light path performance.

Figure 1:
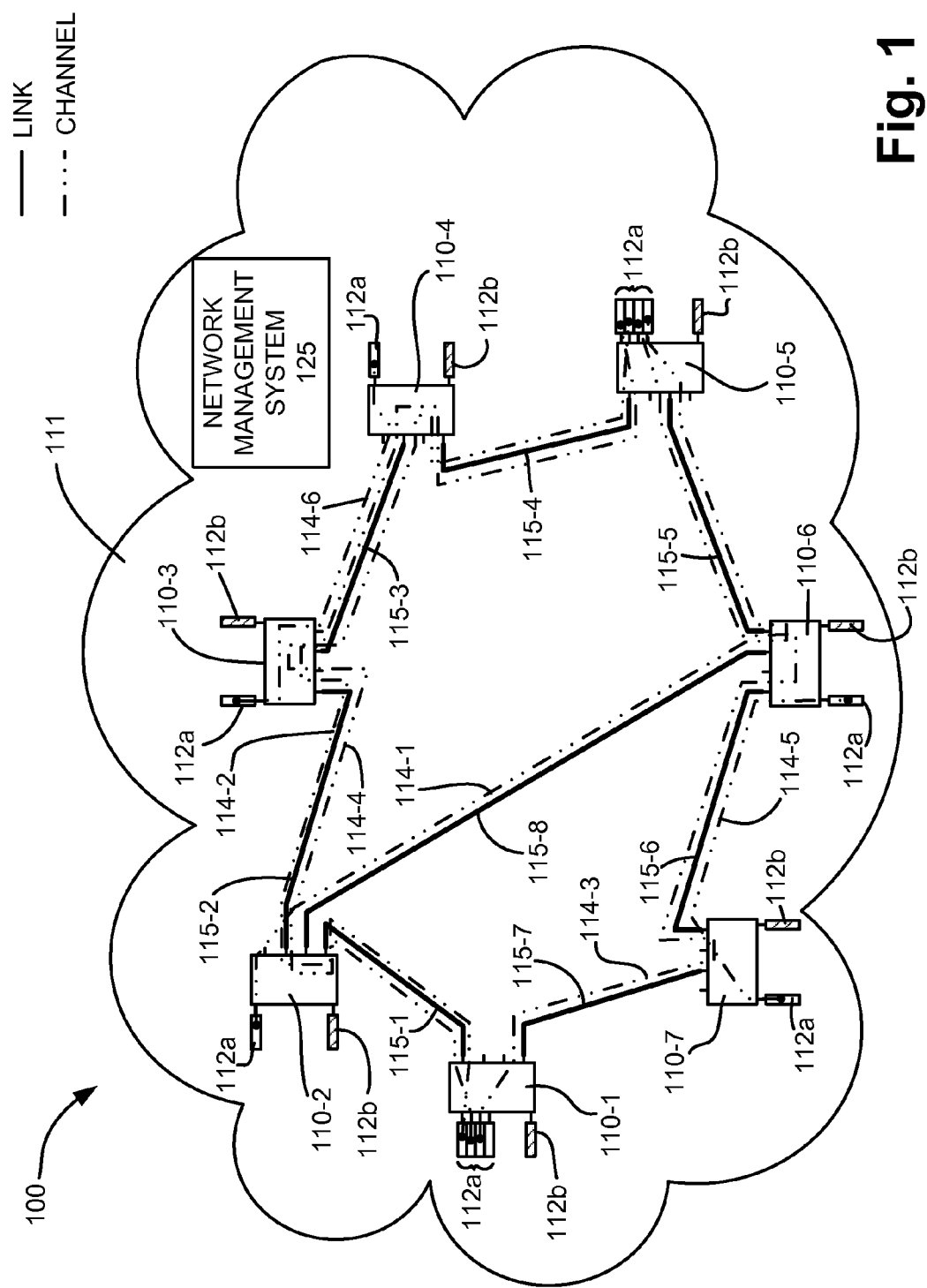
FIG. 1 is a diagram illustrating an exemplary embodiment of an optical network having light-path aggregation capability.

FIG. 1 is a block diagram of an exemplary network 100 in which systems and methods described herein may be implemented. Network 100 may represent a mesh network that includes a number of nodes 110-1 through 110-7 (referred to collectively as nodes 110 and individually as node 110 or node 110-N (where N represents any value) and a network management system 125. In mesh network 100, each line connecting one of nodes 110 to another of nodes 110 may represent one or more optical fibers or links 115 (individually referred to as link 115-x) interconnecting nodes 110. Each optical fiber may also include a large number of individual channels upon which data may be transmitted. For example, data in network 100 may be transmitted using wavelength division multiplexing (WDM), in which multiple optical carrier signals are transmitted on a single optical fiber by using different wavelengths of laser light or electromagnetic radiation to carry different channels. In some implementations, data in network 100 may be transmitted using dense wavelength division multiplexing (DWDM). DWDM uses the C band (i.e., frequencies between 1530 and 1565 nanometers (nm)) and/or L band (i.e., wavelengths between 1565 and 1625 nm). The term "light" as used herein should be construed to include any type of electromagnetic radiation.

Network 100 may include a synchronous optical network be implemented using various topologies (e.g., mesh, ring, etc.). According to an exemplary embodiment, optical network 100 is a long-haul optical network (e.g., long-haul, extended long-haul, ultra long-haul). According to other embodiments, optical network 100 is an optical network other than a long-haul optical network.

In an exemplary implementation, each node 110 may represent a number of optical add/drop multiplexers (OADMs), such as reconfigurable optical add/drop multiplexers (ROADMs) that can switch traffic on the optical domain, without the need to convert the optical signals from/to electrical signals. For example, each node 110, also referred to herein as ROADM nodes 110, may include one or more ROADMs that can remotely switch traffic that was transmitted using WDM or DWDM at the wavelength layer. Each ROADM in a node 110 may include one or more tunable filters that receive a stream of optical signals having different wavelengths that can direct a selected channel (e.g., a particular wavelength in the range of the optical system being implemented (e.g., C-band or L-band)). By using a ROADM, individual or multiple optical channels having different wavelengths may be added and/or dropped from a transport optical fiber without requiring node 110 to convert the optical signals on the WDM channels to non-optical (i.e., electrical) signals and then back to optical signals.

Consistent with embodiments described herein, ROADM nodes 110 may include a colorless (e.g., any wavelength to any add/drop port), a directionless (e.g., any wavelength to any degree), and a contentionless (e.g., any combination of wavelengths to any degree from any port), architecture. As such, ROADM nodes 110 may support any portion of the optical spectrum, any channel bit rate, and/or any modulation format.

As depicted in diagrammatically in FIG. 1, each ROADM node 110 may include a number of reconfigurable optical add/drop (ROAD) cards 112*a/b* (collectively referred to as cards 112) (sometimes referred to as "blades") removeably insertable into a respective node 110 (e.g., into a rack assembly associated with the node). In one embodiment, a number of cards 112 may be arranged in series, with an output line of each card being input to an adjacent card, with a final aggregate optical signal (e.g., after adding/dropping in a respective card) output for transmission via optical links 115. In some implementations, an output of each ROAD card 112 may be input to an optical switch fabric configured to enable each card to be optically coupled with a number of links 115.

As shown, the installed ROAD cards 112 in nodes 110 may include one or more active cards 112*a* (depicted as white boxes in FIG. 1) and one or more installed spare cards 112*b* (depicted as cross-hatched boxes in FIG. 1). In the embodiment of FIG. 1, node 110-1 initially includes four active cards 112*a* and one spare card 112*b*, nodes 110-2, 110-3, 110-4, 110-6, and 110-7 each include one active card 112*a* and one spare card 112*b*, and node 110-5 includes four active cards 112*a* and one spare card 112*b*. It should be understood that the number of installed cards (both active and spare) is exemplary. Any supported number of cards may be installed within each node 110.

As used herein, the phrase "installed spare card" refers to a ROAD card 112 that is physically installed in node 110 and connected to network management system 125, yet is not assigned or associated with a particular channel or path through network 100. Consistent with embodiments described herein, the installed spare cards 112*b* in nodes 110 may be utilized to provide a number of valuable capabilities with network 100, such as light path characterization, wavelength plan defragmentation, failure protection, and long term monitoring. Additional details relating to these features are described in detail below.

As shown in the dashed and dotted lines of FIG. 1, various light paths 114 may be initially configured between add/drop cards 112 in nodes 110. More specifically, light path 114-1 may be configured between an active card 112*a* in node 110-1 and an active card 112*a* in node 110-5 via nodes 110-2 and 110-6. Light paths 114-2 and 114-3 may be configured between respective active cards 112*a* in node 110-1 and respective active cards 112*a* in node 110-5. However light path 114-2 may traverse nodes 110-2, 110-3, and 110-4 and light path 114-3 may traverse nodes 110-7 and 110-6. Light path 114-4 may be configured between active cards 112*a* in node 110-2 and 110-5 via nodes 110-3 and 110-4, light path 114-5 may be configured between an active card in node 110-7 and an active card in node 110-6, and light path 114-6 may be configured between an active card in node 110-3 and an active card in node 110-4. Light paths 114 may comprise optical signals available within the links 115 between end nodes. For example, light path 114-1 and light path 114-5 may utilize a same portion of the optical spectrum (e.g., a same channel), given that the links 115 used for each path are mutually exclusive. In contrast, light paths 114-2 and 114-4 may not utilize the same channel or portion of the spectrum because the paths share at least one traversed link. Consistent with embodiments described herein, the installed spare cards 112 may be utilized to support efficient utilization of nodes 110, links 115, and paths 114

Network management system 125 may manage the configuration of optical network 100 including optical nodes 110 and cards 112. Network management system 125 may permit administrators to monitor, configure, etc., network 100. Network management system 125 may be capable of identifying network state information, resource availability and resource allocation, and/or other parameters pertaining to network 100. Network management system 125 may communicate with a network management module (not illustrated) within nodes 110 via an electrical or packet-based network 111 out of band with optical network 100. For example, network management system 125 may assign path parameters, such as channel, direction, bandwidth, etc. Network management system 125 may include one or more network devices (e.g., a server, a computer, etc.). Network management system 125 may be implemented in a centralized or a distributed fashion, based on the particular implementation.

The number of devices (which includes optical nodes) and the configuration in network 100 are exemplary and provided for simplicity. According to other embodiments, network 100 may include additional devices, fewer devices, different devices, and/or differently arranged devices than those illustrated in FIG. 1. For example, network 100 may include intermediate devices (not illustrated) to permit communication between nodes 110 and/or between nodes 110 and network management system 125, such as amplifiers, repeaters, routers, switches, etc.

Figure 2:
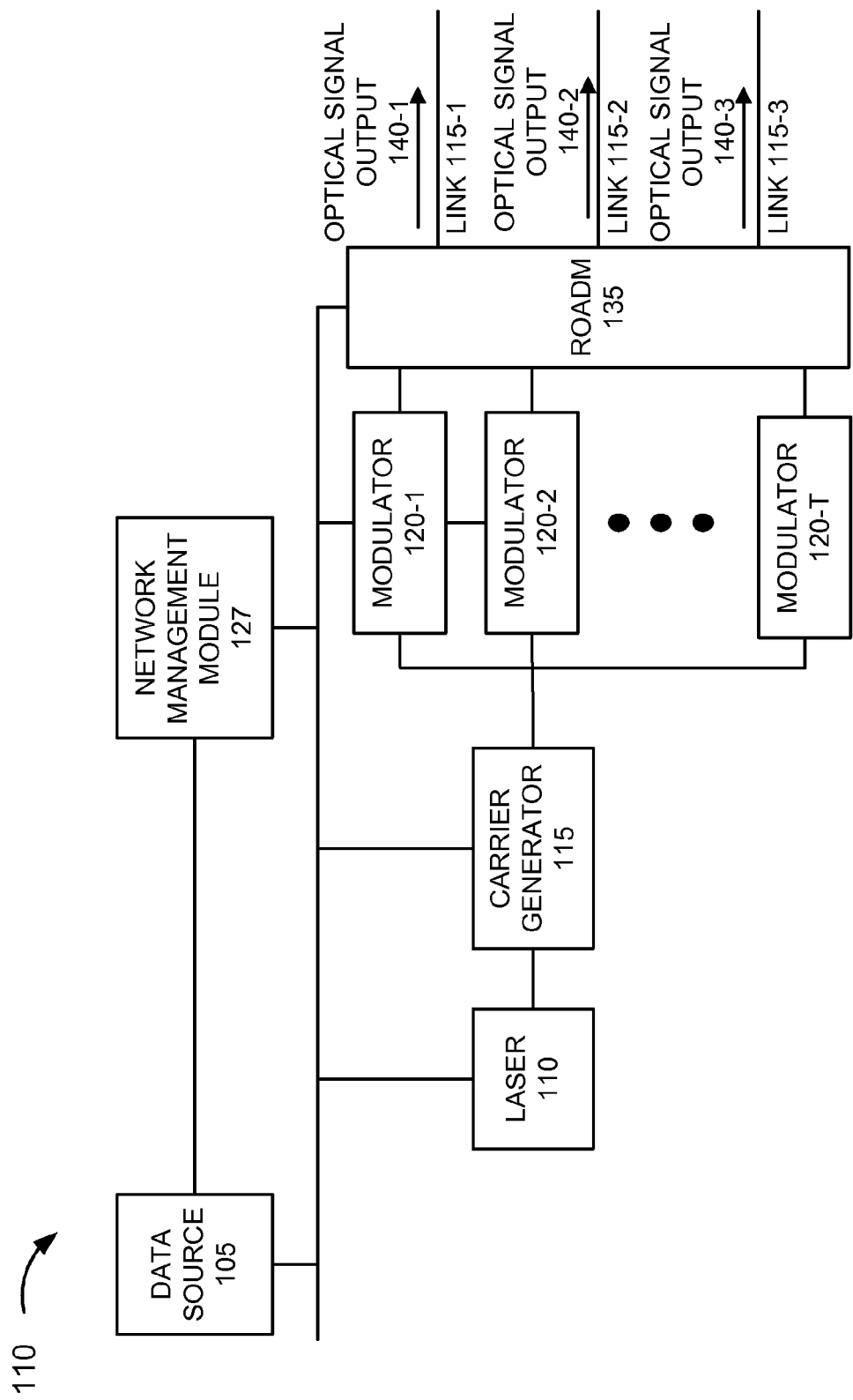
FIG. 2 is a diagram illustrating components of an exemplary embodiment of a transmitting-side of one of the optical nodes depicted in FIG. 1.

FIG. 2 is a diagram illustrating components of an exemplary embodiment of a transmitting-side of one or more of the optical nodes 110 depicted in FIG. 1. As shown, optical node 110 may include a data source 105, a laser 110, a carrier generator 115, modulators 120-1 through 120-T, in which T>1 (referred to individually as modulator 120 or collectively as modulators 120), a network management module 127, and a ROADM 135. As further illustrated, optical links 115-1 through 115-3 are coupled to ROADM 135. The number of optical links 115 is exemplary and provided for simplicity.

The number of components and the configuration (e.g., connection between components) are exemplary and provided for simplicity. According to other embodiments, optical node 110 may include additional components, fewer components, different components, and/or differently arranged components than those illustrated in FIG. 2. For example, the transmitting-side of optical node 110 may include a power source, an optical amplifier (e.g., Erbium Doped Fiber Amplifier (EDFA), Raman amplifier, etc.), digital signal processing (DSP) (e.g., forward error correction (FEC), equalization, filtering, etc), an optical transceiver, etc. Additionally, for example, the transmitting-side of optical node 110 may not include carrier generator 115 and multiple lasers 110 may be used.

Data source 105 may provide data that is to traverse optical node(s) 110 in optical network 100. Laser 110 may include a laser (e.g., a cooled laser). According to an exemplary embodiment, laser 110 may include a tunable laser (e.g., a Distributed Feedback (DFB) laser, an External-Cavity Laser (ECL), a Sampled Grating Distributed Bragg Reflector (SGDBR) laser, etc.). Carrier generator 115 may include components (e.g., a Photonic Integrated Circuit (PIC) or other known multicarrier generating architectures) to produce a single carrier optical channel and/or a multicarrier optical channel, such as a super-channel.

Modulators 120 may include optical modulators to provide a modulation format in terms of constellation (e.g., binary, quaternary, 8-ary, 16-ary, higher order constellations, etc.), manner of modulation (e.g. intensity, phase, frequency, polarization), etc.

Network management module 127 may include logic, such as one or more processors, to manage transport channels and signaling. For example, network management module 127 may select bandwidths for optical channels, optimize channel capacity, total capacity, spectral efficiency, reach distance, etc. Network management module 127 may identify whether an optical channel is single-carrier or multi-carrier, and the type of modulation for each optical carrier. Network management module 127 may also correlate performance and alarm information across all optical carriers. Network management module 127 may include one or multiple processors, microprocessors, multi-core processors, application specific integrated circuits (ASICs), controllers, microcontrollers, and/or some other type of hardware logic to perform the processes or functions described herein.

As briefly described above, ROADM 135 may include a colorless (e.g., any wavelength to any add/drop port), a directionless (e.g., any wavelength to any degree), and a contentionless (e.g., any combination of wavelengths to any degree from any port), architecture that supports any portion of the optical spectrum, any channel bit rate, and/or any modulation format.

According to an exemplary process, as illustrated in FIG. 2, the transmitting-side of optical node 110 may output optical signals (e.g., optical signal outputs 140-1 through 140-3) to optical links 115, which may traverse light paths 114 in optical network 100. The number of output optical signals is exemplary and provided for simplicity.

Figure 3:
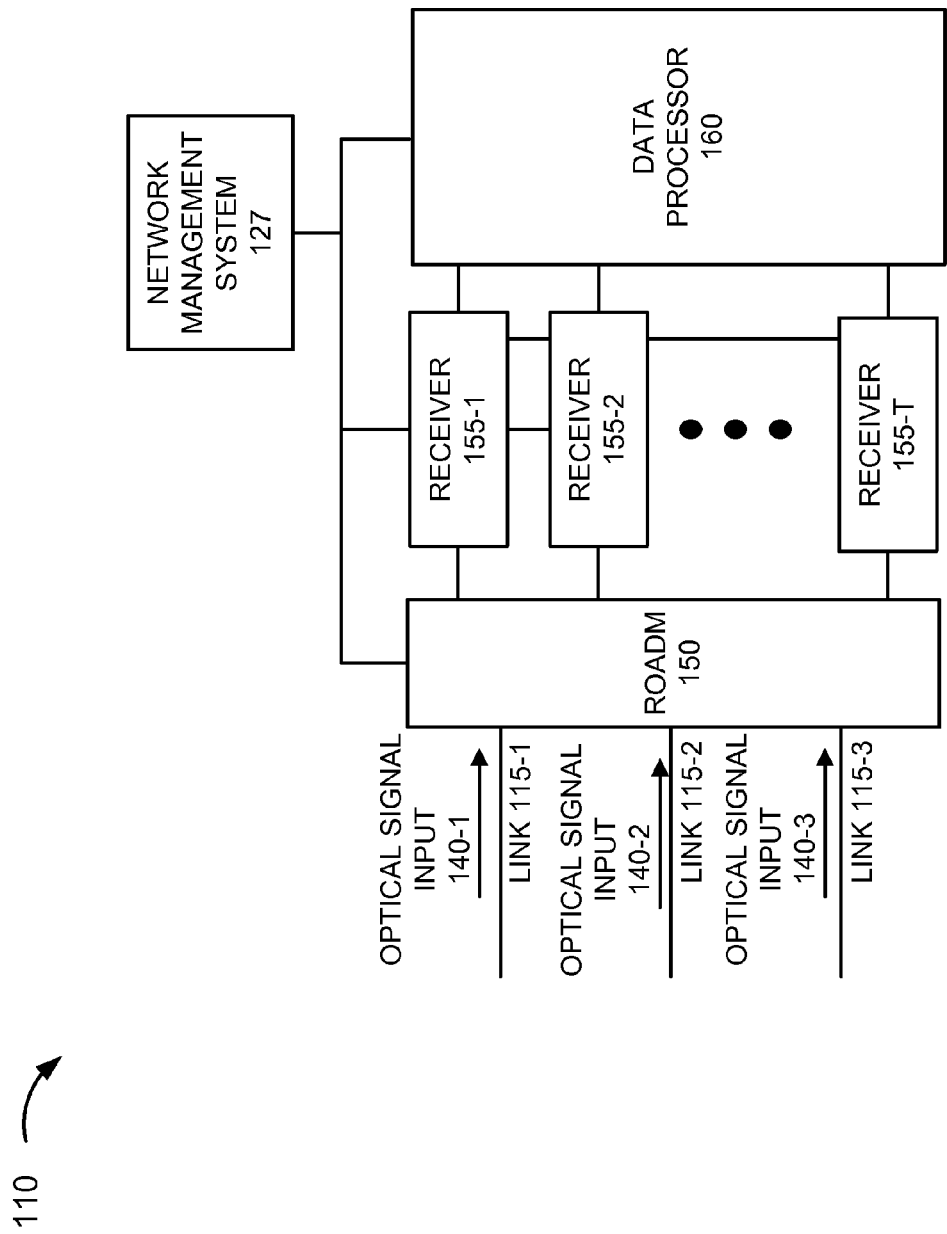
FIG. 3 is a diagram illustrating components of an exemplary embodiment of a receiving-side of one of the optical nodes depicted in FIG. 1.

FIG. 3 is a diagram illustrating components of an exemplary embodiment of a receiving-side of one or more of optical nodes 110 depicted in FIG. 1. As illustrated, optical node 110 includes network management module 127, a ROADM 150, receivers 155-1 through 155-T, in which T>1 (referred to individually as receiver 155 or collectively as receivers 155), and a data processor 160. As further illustrated, optical links 115-1 through 115-3 are coupled to ROADM 150.

The number of components and the configuration (e.g., connection between components) are exemplary and provided for simplicity. According to other embodiments, optical node 110 may include additional components, fewer components, different components, and/or differently arranged components than those illustrated in FIG. 3. For example, optical node 110 may include a power source, an optical amplifier (e.g., Erbium Doped Fiber Amplifier (EDFA), Raman amplifier, etc.), DSP, a transceiver, etc.

Network management module 127 may include logic to manage transport channels and signaling, as previously described. Network management module 127 may correlate multi-carriers to a transport channel, such as with a superchannel. Network management module 127 may also manage failures pertaining to a transport channel. For example, network management module 127 may identify when an optical carrier(s) may need to be re-transmitted (e.g., due to the failure) by a source or a transmitting optical node 110.

ROADM 150 may include a ROADM similar to that described above (i.e., ROADM 135). Receivers 155 may include optical receivers or transponders. Data processor 160 may include logic to convert optical signals 140 to construct frames, packets, or other type of data containers.

Figure 4A:
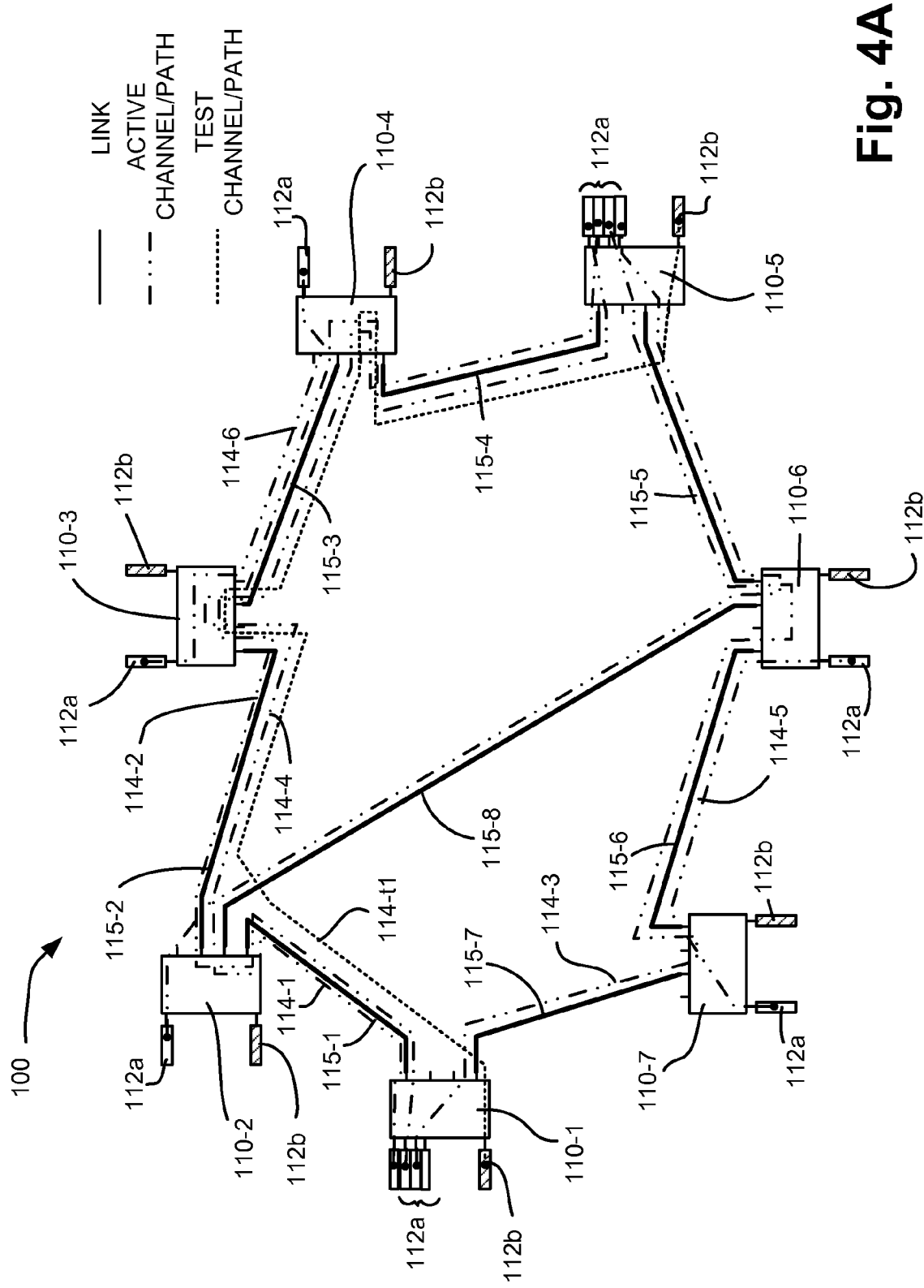
FIGS. 4A-4C are diagrams illustrating a portion of the optical network of FIG. 1 consistent with one implementation.
Figure 4B:
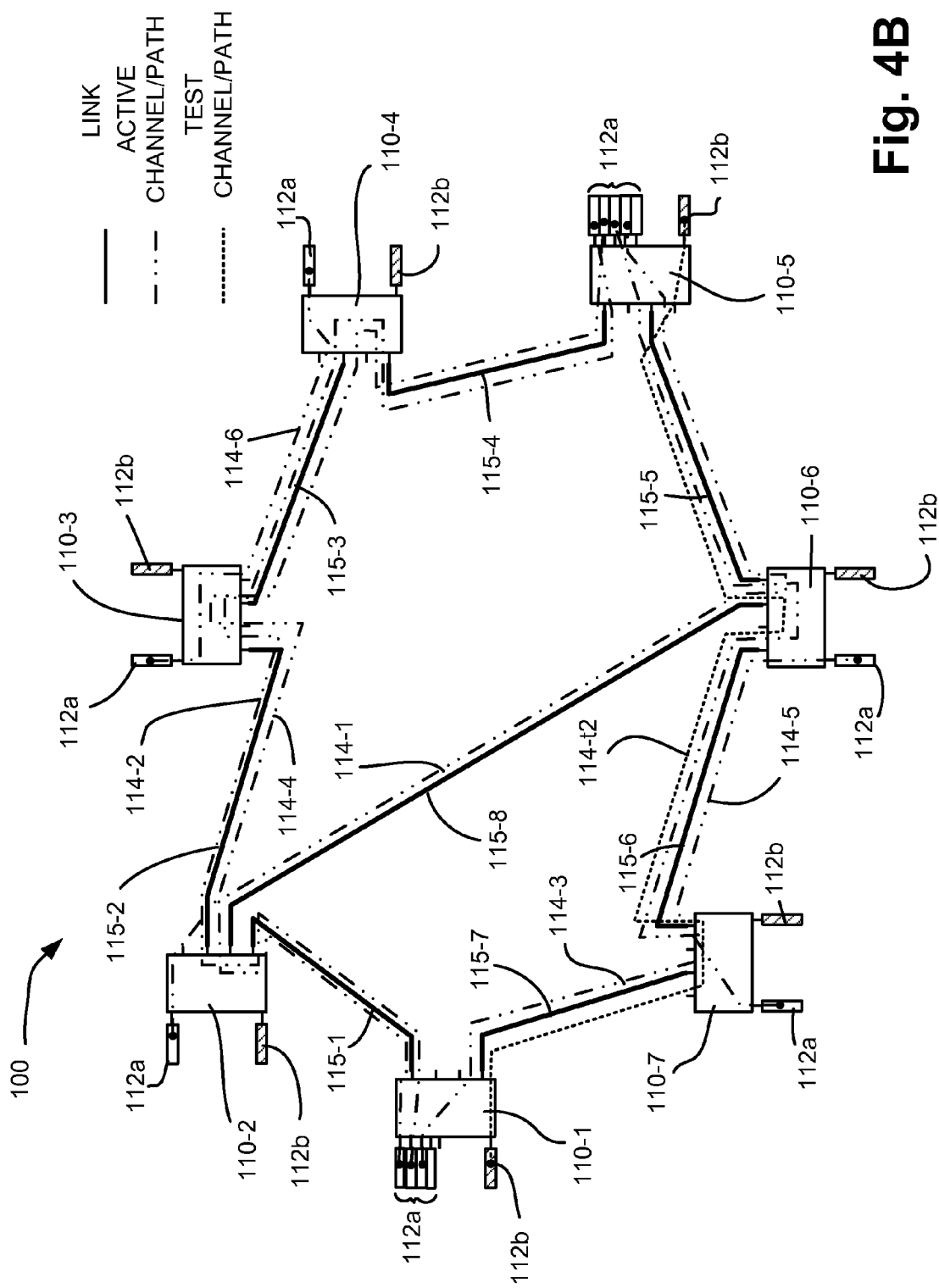
Figure 4C:
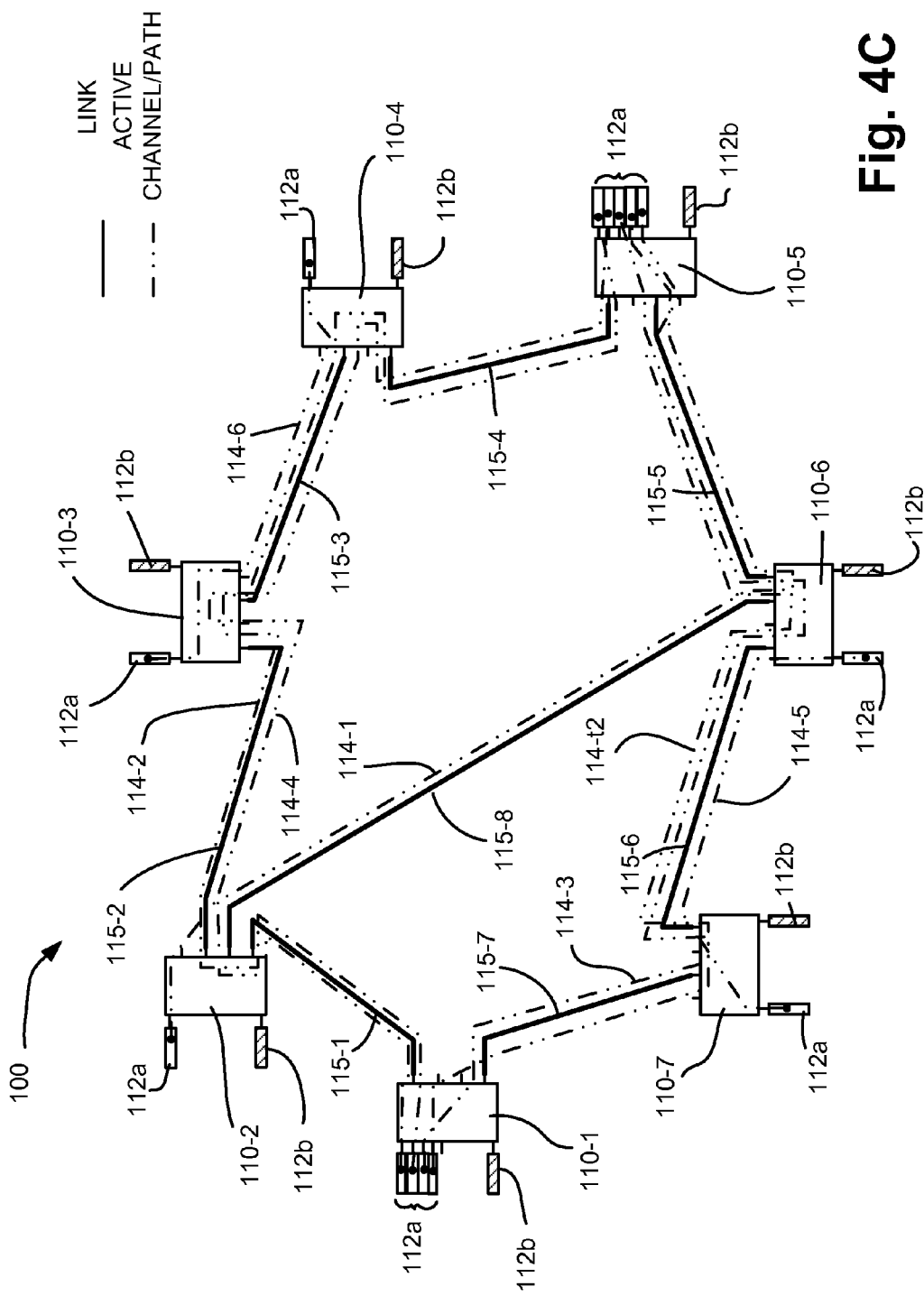
Figure 5:
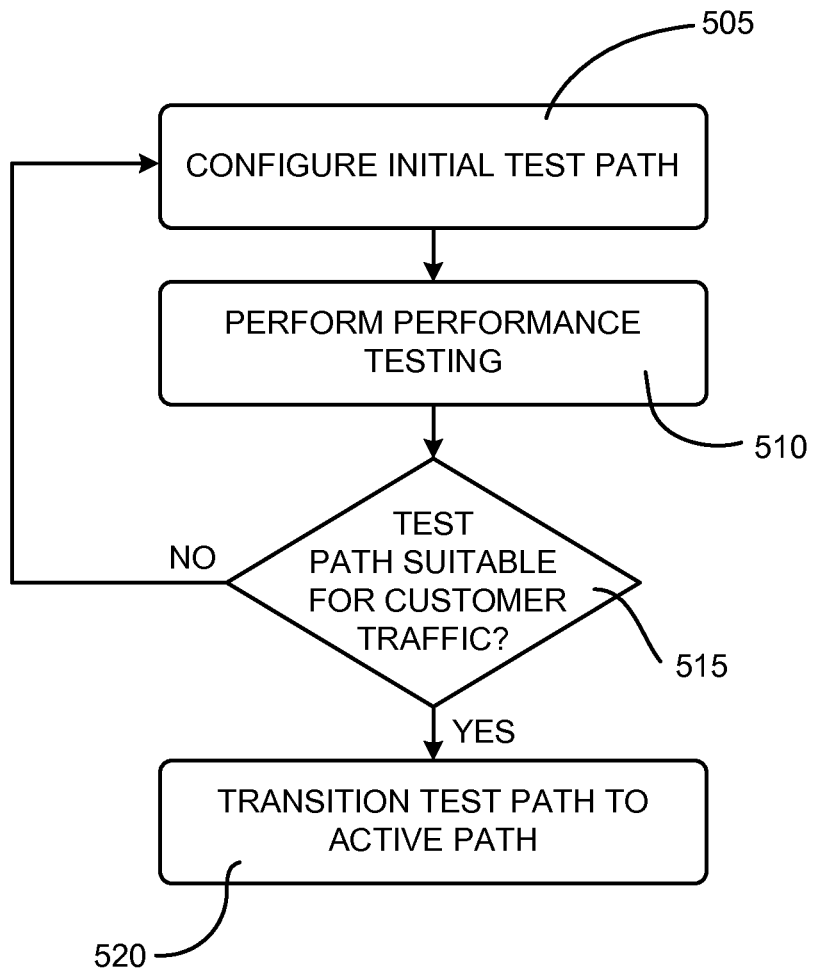
FIG. 5 is a flow diagram illustrating an exemplary process for configuring a new light path consistent with the embodiment of FIGS. 4A-4C.

Consistent with one embodiment described herein, spare cards 112*b* in nodes 110 may be used to remotely configure (e.g., characterize) and test a new light path 114 in network 100 prior to activation. FIGS. 4A-4C are diagrams illustrating a portion of network 100 consistent with this implementation. FIG. 5 is a flow diagram illustrating an exemplary process for configuring a new light path (e.g., for a selected DWDM channel) in network 100 consistent with the embodiment of FIGS. 4A-4C. As shown in FIG. 4A, an initial test path 114-test1 (114-*t*1) may be configured between spare card 112*b* in node 110-1 and spare card 112*b* in node 110-5 via nodes 110-2, 110-3, and 110-4 (block 505). For example, an operator of network management system 125 may identify/ select an available path/channel in the fiber links 115 based on desired or required criteria, such as bandwidth, path length, etc. For the purposes of this example, assume that the initial test path routes through nodes 110-2, 110-3, and 110-4. Network management system 125 may then remotely activate spare cards 112*b* in each of nodes 110-1 and 110-5 to send/ receive on the selected channel.

Following initial configuration, performance testing of test path 114-*t*1 may be performed (block 510). For example, network management system 125 may cause data traffic to be modulated (e.g., via a modulator 120) and transmitted via ROADM 135 in spare card 112*b* of node 110-1 via the selected path/channel. Performance metrics for the transmitted data may be analyzed to determine whether the selected channel path/channel provides an acceptable level of service to be implemented for customers of network 100 (block 515). If it is determined that performance testing has determined that test path 114-*t*1 is not suitable for customer traffic (block 515—NO), processing returns to block 505 for identification/ selection of another available path/channel.

As shown in FIG. 4B, a second test path/channel 114-*t*2 may be identified/selected that travels from node 110-1 to node 110-5 via nodes 110-7 and 110-6. Processing may proceed to blocks 510 and 515 for test path 114-*t*2 and, assuming that path 114-*t*2 meets the required performance criteria (block 515—YES), processing proceeds to block 520. In block 520, test path 114-*t*2 is transitioned from a test path to an active path. For example, the configuration settings for spare cards 112*b* in nodes 110-1 and 110-5 relating to test path 114-*t*2 may be transferred or otherwise applied to available active cards 112*a* in nodes 110-1 and 110-5, as shown in FIG. 4C. At this point, the new light path is active for customer traffic and spare cards 112*b* may be deactivated until they are needed.

Consistent with another embodiment described herein, spare cards 112*b* in nodes 110 may be used to remotely facilitate optical network defragmentation. Network fragmentation refers to a scenario in which, over time, multiple paths/channels between source and destination nodes are configured using a variety of different paths and wavelengths. When the amount of traffic reaches a predetermined amount, it is more efficient to establish a new path or link between the nodes to handle all of the traffic, rather than have it routed via different collections of nodes. Consistent with the present embodiment, spare cards 112*b* in nodes 110 may be used to facilitate efficient defragmentation of the various paths via a new path between two nodes 110.

FIGS. 6A-6F are diagrams illustrating a portion of network 100 consistent with this implementation. FIG. 7 is a flow diagram illustrating an exemplary process for defragmenting a wavelength plan in network 100 consistent with the embodiment of FIGS. 6A-6F. For the purposes of this simplified example, assume that network 100 is operating in C-band at the 25 GHz grid spacing and that light path 114-1 includes DWDM channel 5 (1534.25 nm), light path 114-2 includes DWDM channel 10 (1538.98 nm), light path 114-3 also includes DWDM channel 10 (1538.98 nm), and light path light path 114-4 includes DWDM channel 20 (1548.51 nm).

Processing may begin with network management system 125 determining that a predetermined level of network fragmentation has occurred in network 100 (block 705). For example, network management system 125 may determine that traffic between two particular nodes (e.g., node 101-1 and node 101-5) has exceed a predetermined threshold, either in terms if total bandwidth, uptime, usage, etc.

Following the fragmentation determination, network management system 125 may activate (e.g., light up) or identify a new link 615 (FIG. 6A) between the nodes identified in the fragmentation determination of block 705 (e.g., nodes 110-1 and 110-5) (block 710). In some implementations, new link 615 may be formed as an express link directly connecting nodes 110-1 and 110-5. However, in other implementations new link 615 may include one or more intermediate nodes 110 and may include a shortest path between nodes 110-1 and 110-5. Additionally, in some implementations, link 615 may include a previously "dark" (e.g., inactive) fiber span (e.g., a pair of fibers for a duplex configuration).

After activation of the new link 615, one of the fragmented paths (channels) is selected from the identified set of fragmented light paths (block 715). Network management system 125 may determine whether the selected path conflicts with a previously transitioned path (block 720). For example, where two of the identified fragmented paths each transmit using the same channel (such as paths 114-2 and 114-3), they may not be transitioned to a new path without changing one of the channels to avoid a conflict. If it is determined that the selected path conflicts (block 720—YES), processing proceeds to block 750 described below.

However, if it is determined that the selected path does not conflict with any other transitioned paths (block 720—NO), spare cards 112b in nodes 110-1 and 110-5 may be activated and configured to transmit on a wavelength associated with the selected path (block 725). Assume that processing starts with light path 114-1 (DWDM channel 5). Spare cards 112b in nodes 110-1 and 110-5 may be configured to transmit/receive on DWDM channel 5 path via new link 615. This is depicted as first new light path 614-1 in FIG. 6B. Network management system 125 may perform performance testing of the channel/path (e.g., channel 5 on path 615) to determine whether it meets service requirements (e.g., service level requirements (SLAs) for the particular channel (block 730). If not (block 730—NO), processing may return to block 710 for determination of a different link. Alternatively, processing may return to block 715 for selection of another one of the fragmented paths, with the first fragmented path being removed from the group of paths to be defragmented.

Figure 6A:
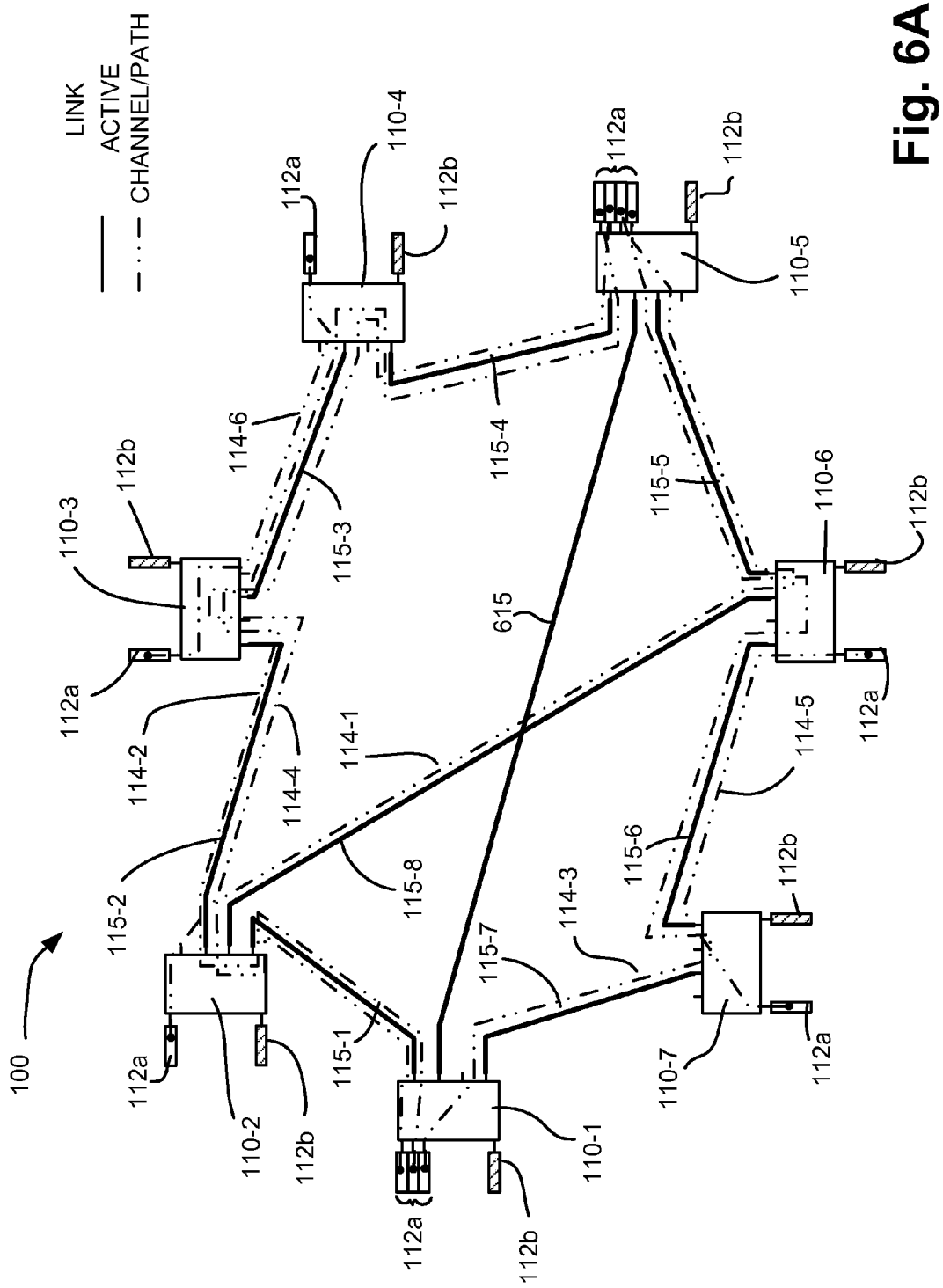
FIGS. 6A-6F are diagrams illustrating a portion of the optical network of FIG. 1 consistent with another implementation.
Figure 6B:
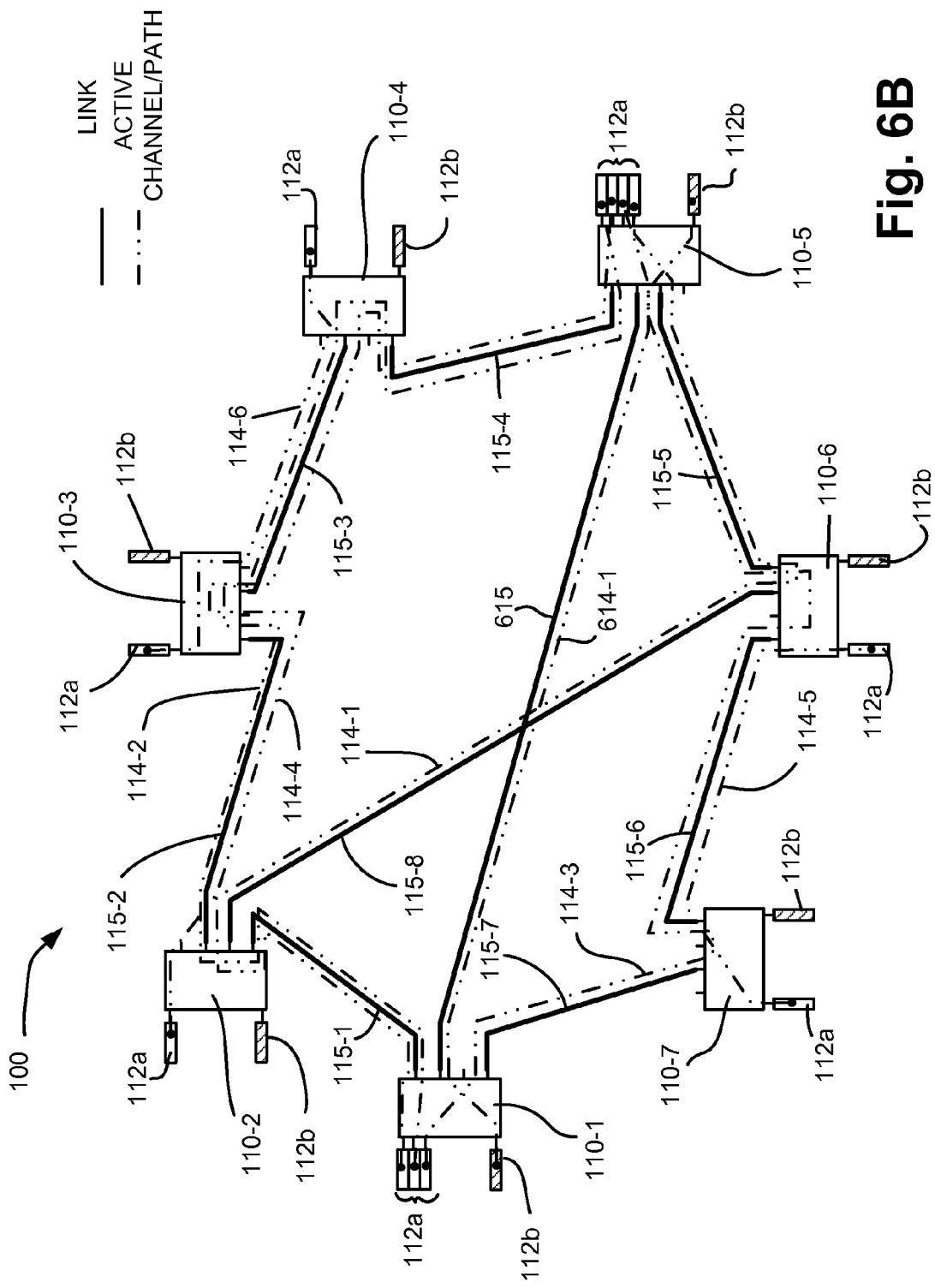
Figure 6C:
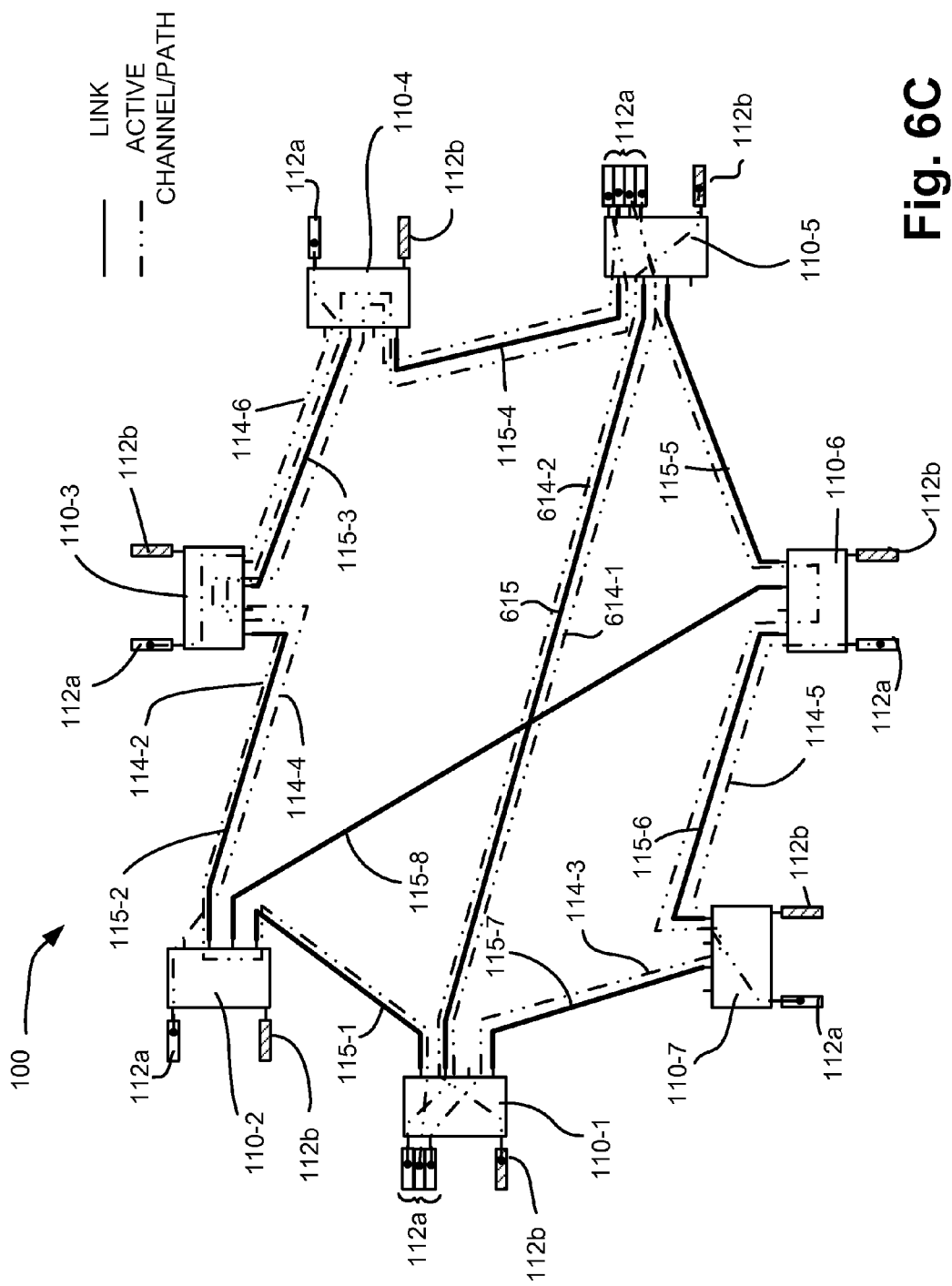
Figure 7:
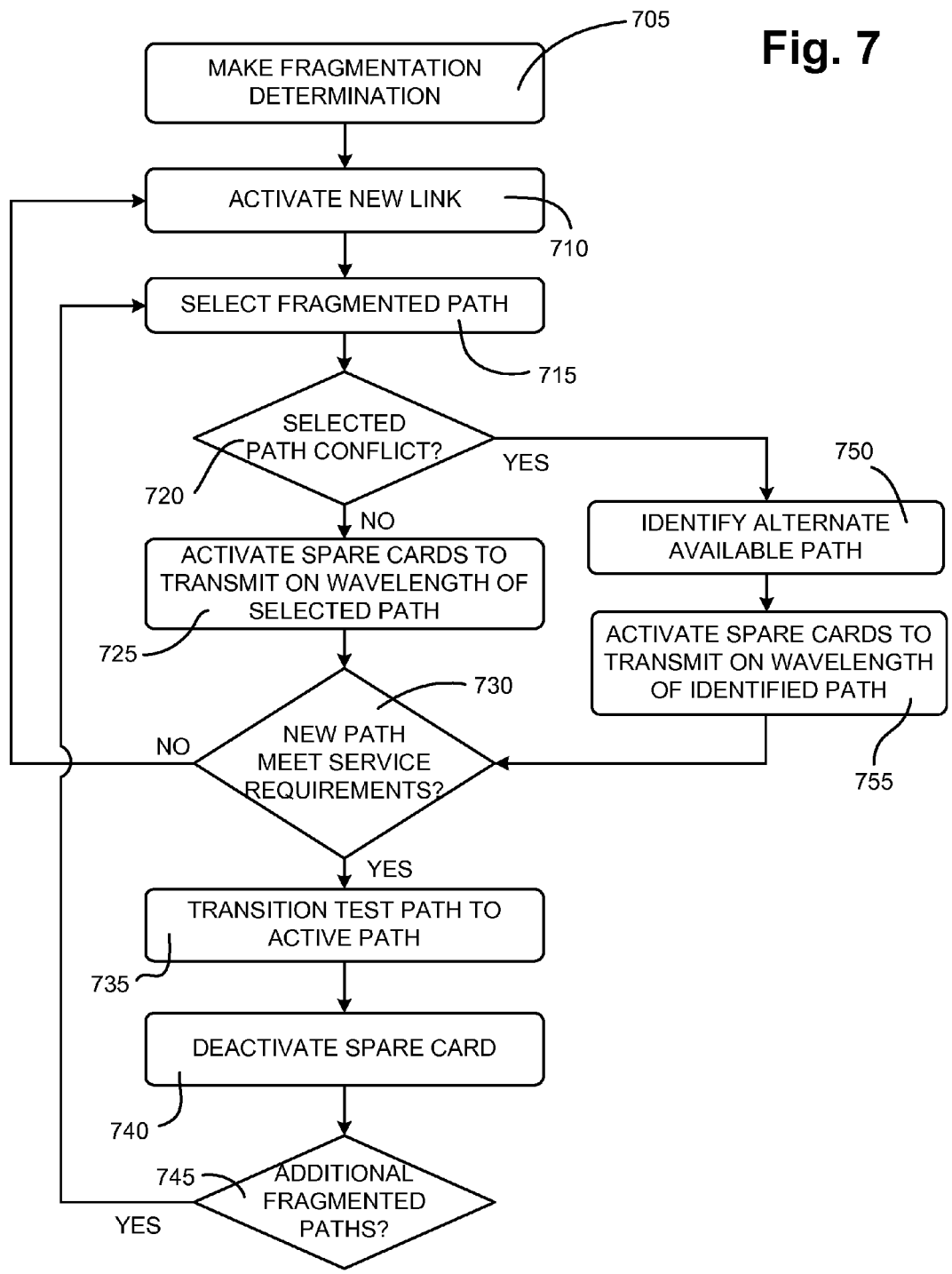
FIG. 7 is a flow diagram illustrating an exemplary process for defragmenting a wavelength plan consistent with the embodiment of FIGS. 6A-6F.

When it is determined that the channel/path combination via link 615 is satisfactory (block 730—YES), network management system 125 may configure the active card 112a associated with the selected path (e.g., path 114-1) to transmit/receive via the tested new path (e.g., path 614-1) (block 735), as shown in FIG. 6C. Spare cards 112b in nodes 110-1 and 110-5 may be deactivated following transition of the path to active cards 112a (block 740). Network management system 125 may then determine whether any additional paths 114 have been identified for defragmentation (block 745). If not, processing ends. However, when it is determined that additional fragmented paths remain (block 745—YES), processing returns to block 715 for selection of the next path.

Figure 6D:
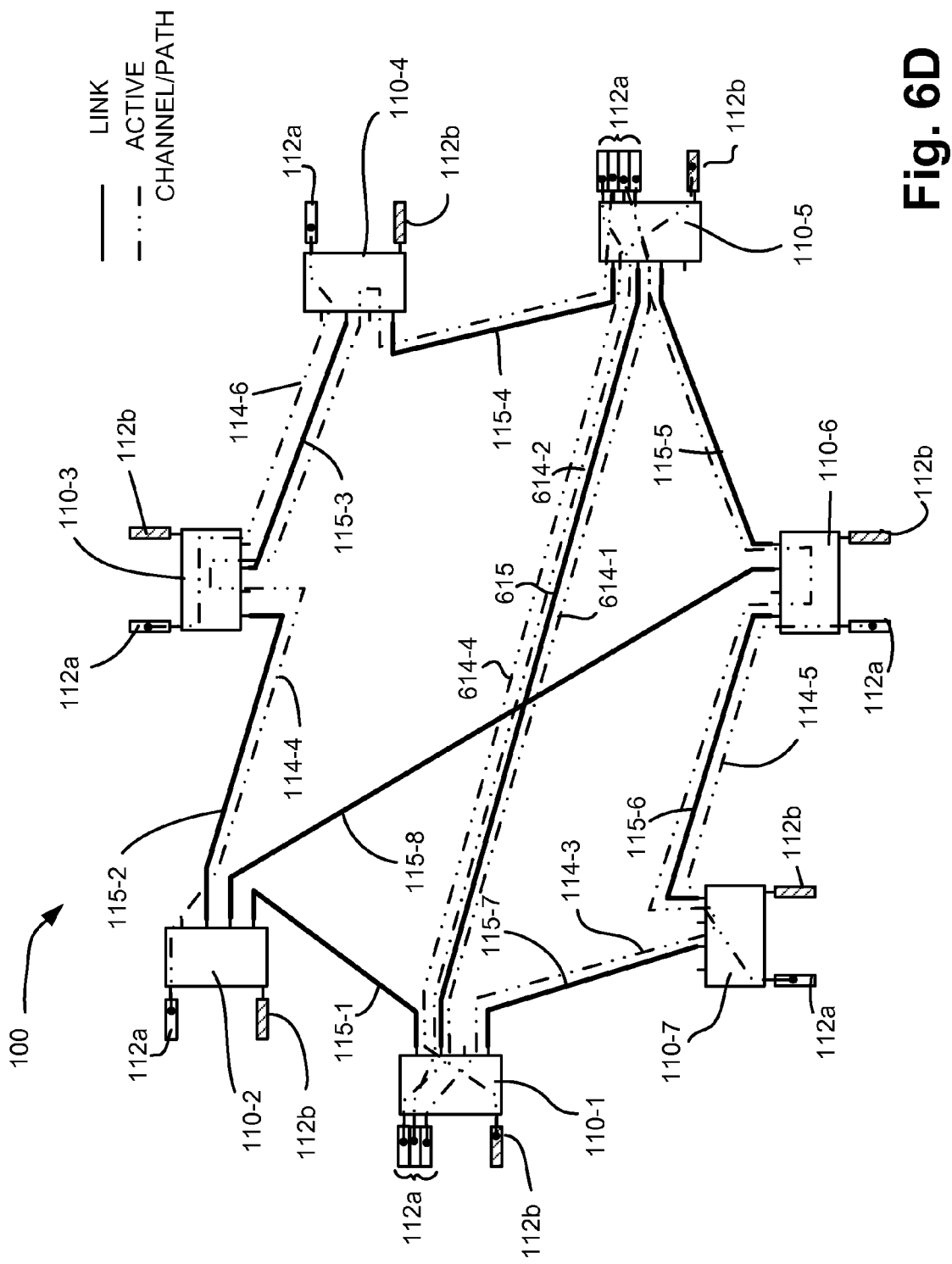

Consistent with the above description, network management system 125 may next determine whether a channel associated with light path 114-2 conflicts with a previously transitioned path (block 720). In this example, path 114-2 does not conflict with new path 614-1. Accordingly, spare cards 112b in nodes 110-1 and 110-5 may be configured to transmit/receive one a new light path 614-2 on new link 615 corresponding to light path 114-2 (block 725), as depicted in FIG. 6C. Testing of light path 614-2 is performed (block 730) and, if successful, active cards 112a in nodes 110-1 and 110-5 associated with the selected path (e.g., path 114-2) may be configured to transmit/receive via the tested new path (e.g., path 614-2) (block 735), as shown in FIG. 6D.

In some implementations, light path defragmentation may be performed for traffic originating from or destined for nodes other than the end nodes of new link 615. For example, as depicted in FIG. 6D, light path 114-4 may originate/terminate at node 110-2. However, network management system 125 may determine that optimal efficiency in network 100 may be realized by transitioning path 114-4 to a new path 614-4 via link 115-1 and new link 615. In such circumstances, network management system 125 may include path 114-4 in the listing of fragmented paths for defragmentation.

Figure 6E:
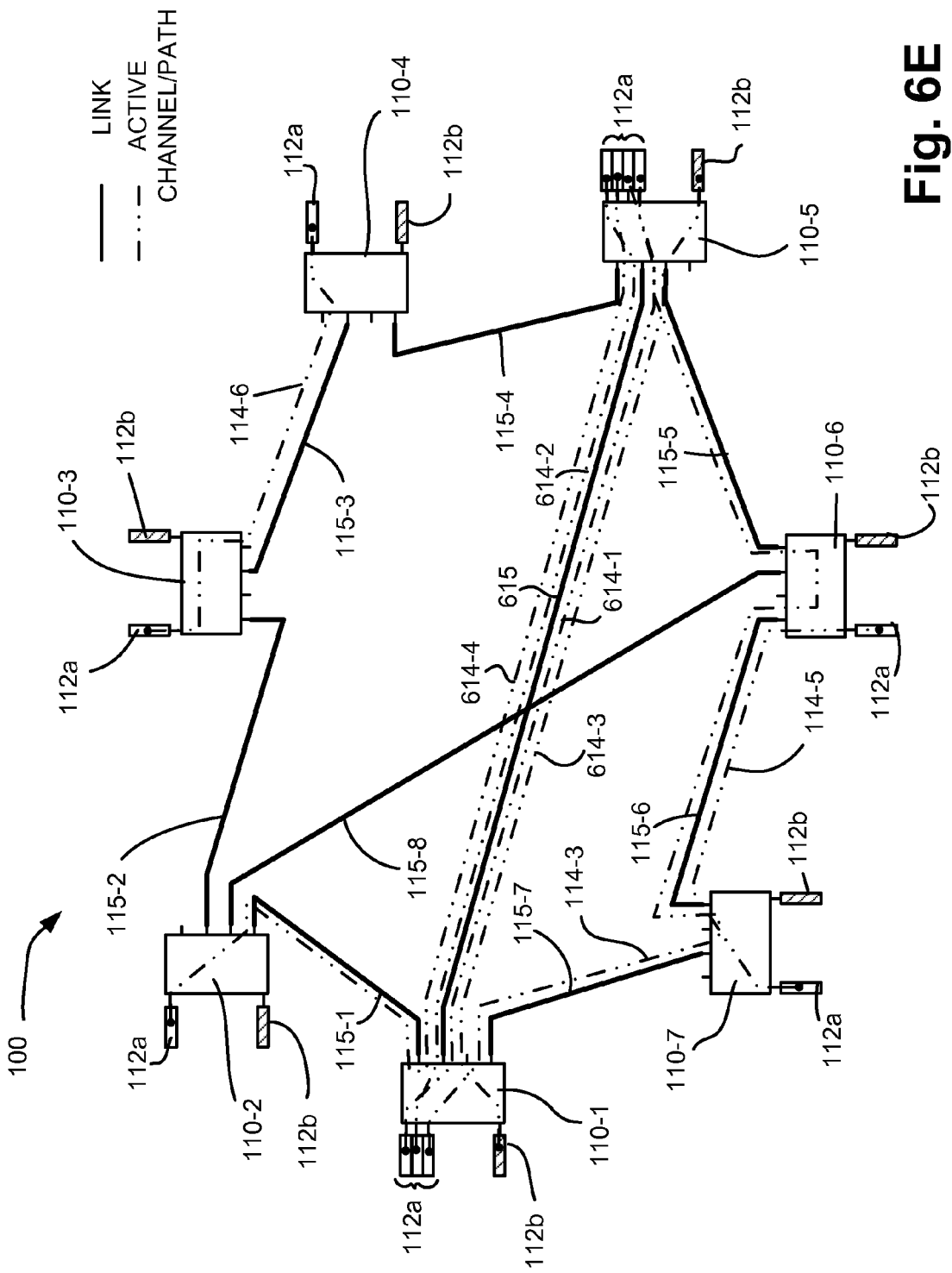

Accordingly, network management system 125 may determine whether a channel associated with light path 114-4 conflicts with a previously transitioned path (block 720). In this example, it may be determined that the channel for path 114-4 does not conflict with previously established new paths 614-1 and 614-2 or any other channels on link 115-1 (between nodes 110-1 and 110-2). Accordingly, spare cards 112b in nodes 110-2 and 110-5 may be configured to transmit/receive one a new light path 614-4 via new link 615 corresponding to light path 114-4 (block 725), as depicted in FIG. 6D. Testing of light path 614-4 is performed (block 730) and, if successful, active cards 112a in nodes 110-2 and 110-5 associated with the selected path (e.g., path 114-2) may be configured to transmit/receive via the tested new path (e.g., path 614-2) (block 735), as shown in FIG. 6E.

Figure 6F:
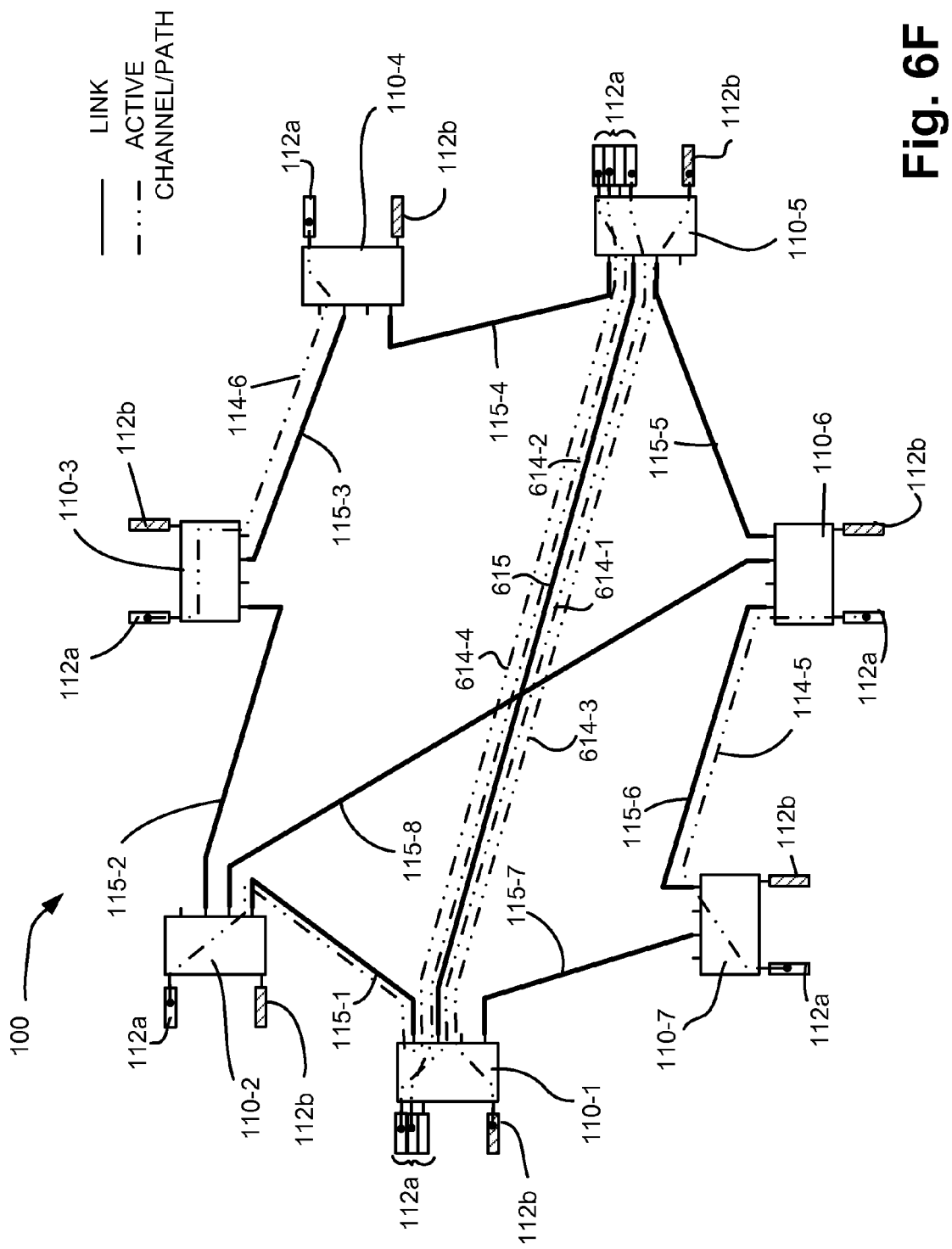

Network management system 125 may next determine whether a channel associated with light path 114-3 conflicts with a previously transitioned path (block 720). In this example, path 114-3 is found to conflict with previously established path 614-4. That is path 614-4 and path 114-3 both transmit on DWDM channel 10. Accordingly, processing proceeds to block 750 in which network management system 125 identifies another available path/channel in new link 615 for handing path 114-3. For example, network management system 125 may determine that DWDM channel 15 (1543.71 nm) is available. Spare cards 112b in nodes 110-1 and 110-5 may be configured to transmit/receive on a new light path 614-4 on new link 615 corresponding to the identified path (e.g., DWDM channel 15) (block 755). Processing may then return to block 730 for testing. If testing of new path 614-4 is successful, active cards 112a in nodes 110-2 and 110-5 associated with the selected path (e.g., path 114-2) may be configured to transmit/receive via the tested new path (e.g., path 614-2) (block 735), as shown in FIG. 6F.

Figure 8A:
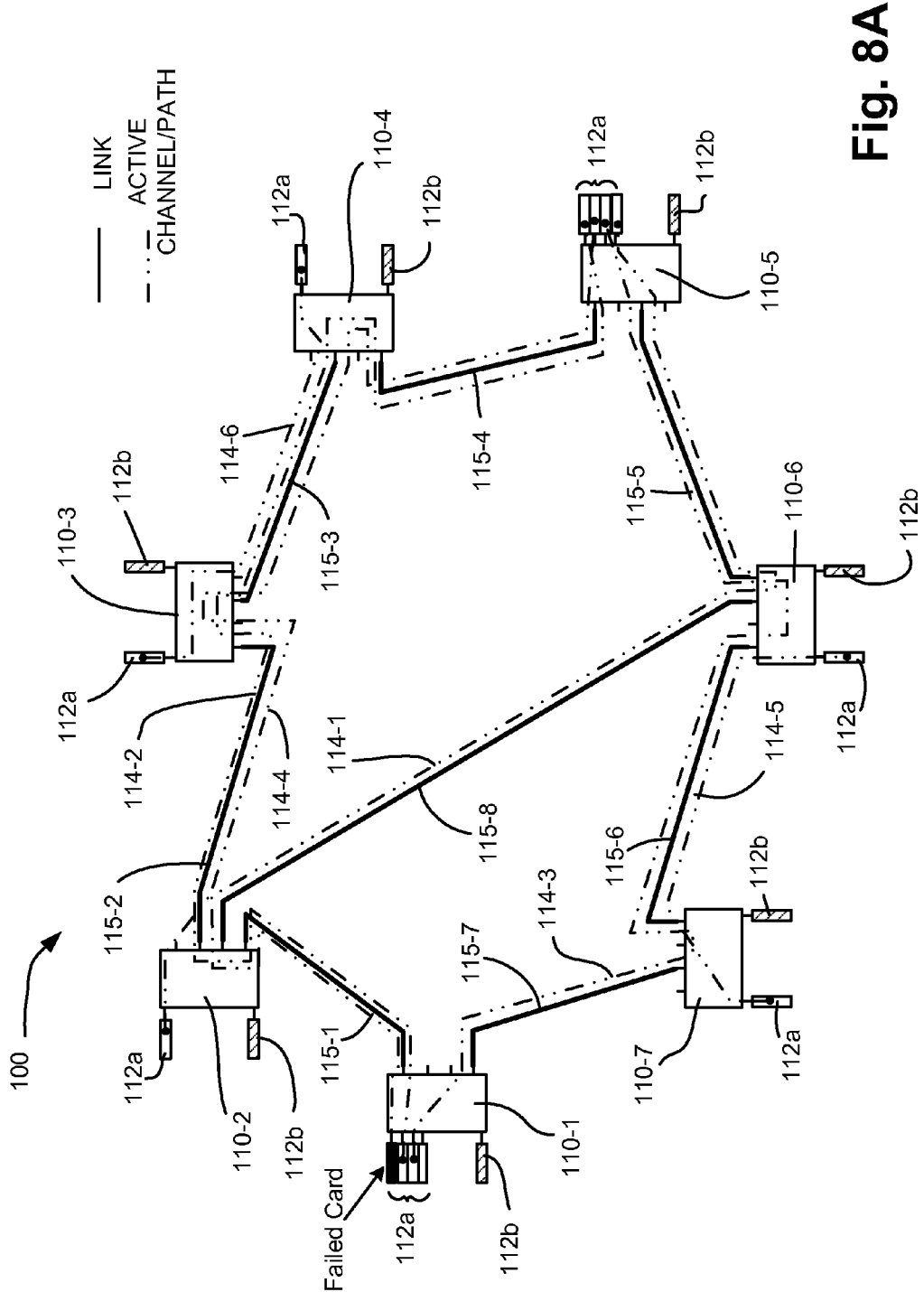
FIGS. 8A and 8B are diagrams illustrating a portion of the optical network of FIG. 1 consistent with yet another implementation.
Figure 8B:
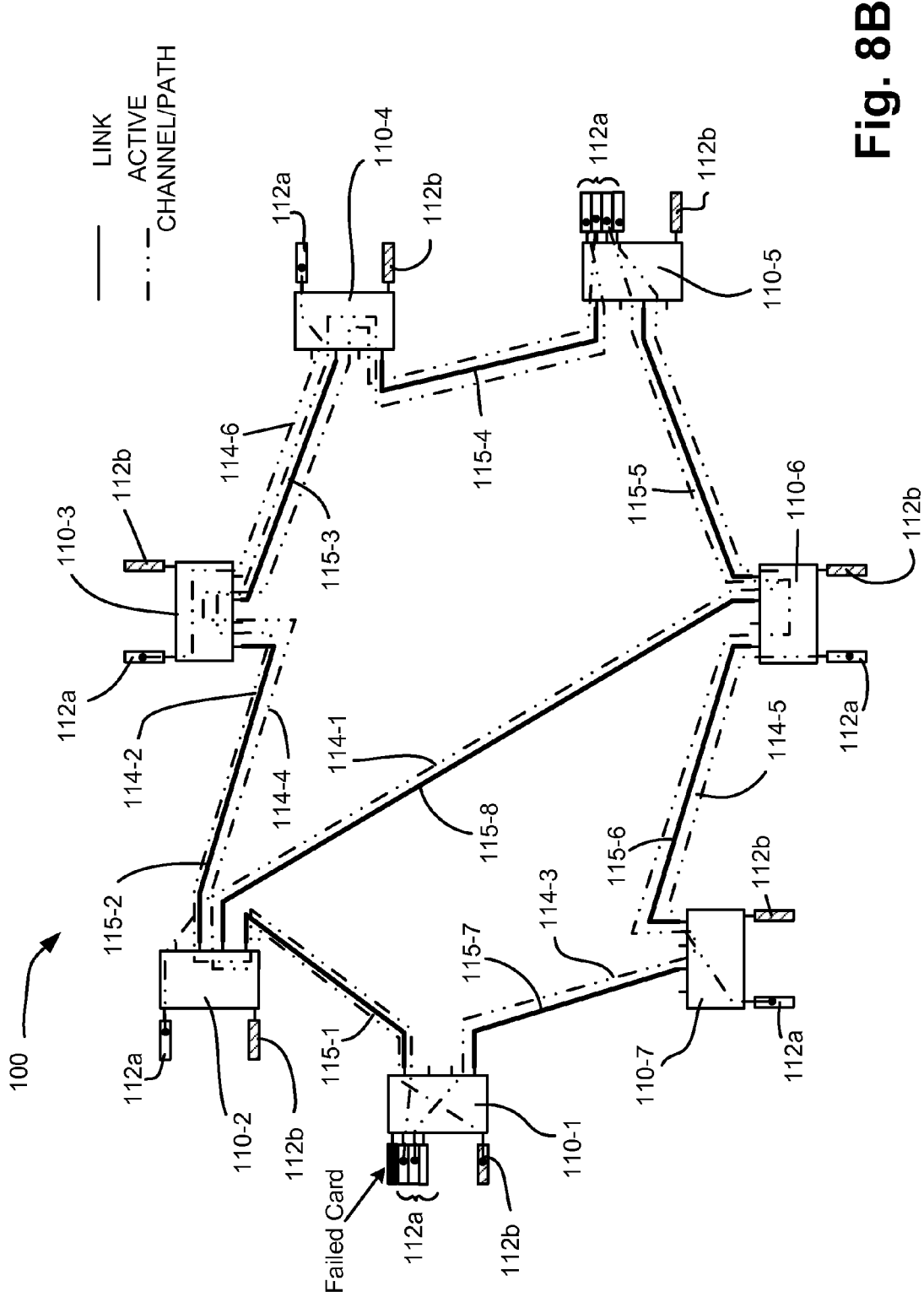
Figure 9:
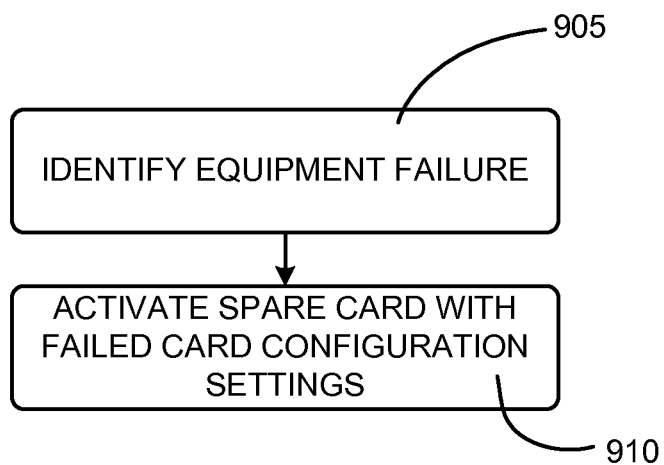
FIG. 9 is a flow diagram illustrating an exemplary process for protecting the network of FIG. 1 consistent with the embodiment of FIGS. 8A and 8B.

Consistent with another embodiment described herein, spare cards 112b in nodes 110 may be used to provide backup protection against both equipment and fiber-related failures. FIGS. 8A and 8B are diagrams illustrating a portion of network 100 consistent with a equipment-related failure. FIG. 9 is a flow diagram illustrating an exemplary process for protecting network 100 consistent with the embodiment of FIGS. 8A and 8B. For the purposes of this simplified example, assume that an active card 112a in node 110-1 has failed.

Processing may begin with network management system 125 determining that an equipment failure in an active card 112a has occurred (block 905). Failure detection may be performed in a number of ways, such as optical port monitoring (e.g., via a photodetector), electrical (e.g., heartbeat) monitoring, etc. When it is determined that a particular active card 112a has failed, as depicted in FIG. 8A, network management system 125 may immediately activate spare card 112b to handle the traffic previously handled by the failed active card 112a (block 910).

For example, network management system 125 may cause network traffic previously directed to the failed active card 112a to be directed to spare card 112b, as shown in FIG. 8B. Network management system 125 may further cause configuration settings associated with the failed active card 112a to be applied to spare card 112b, such as direction, wavelength, and modulation settings associated with the failed active card 112a. In some implementations, network management system 125 may maintain a table of configuration settings for each of active card 112a in network 100.

Figure 10A:
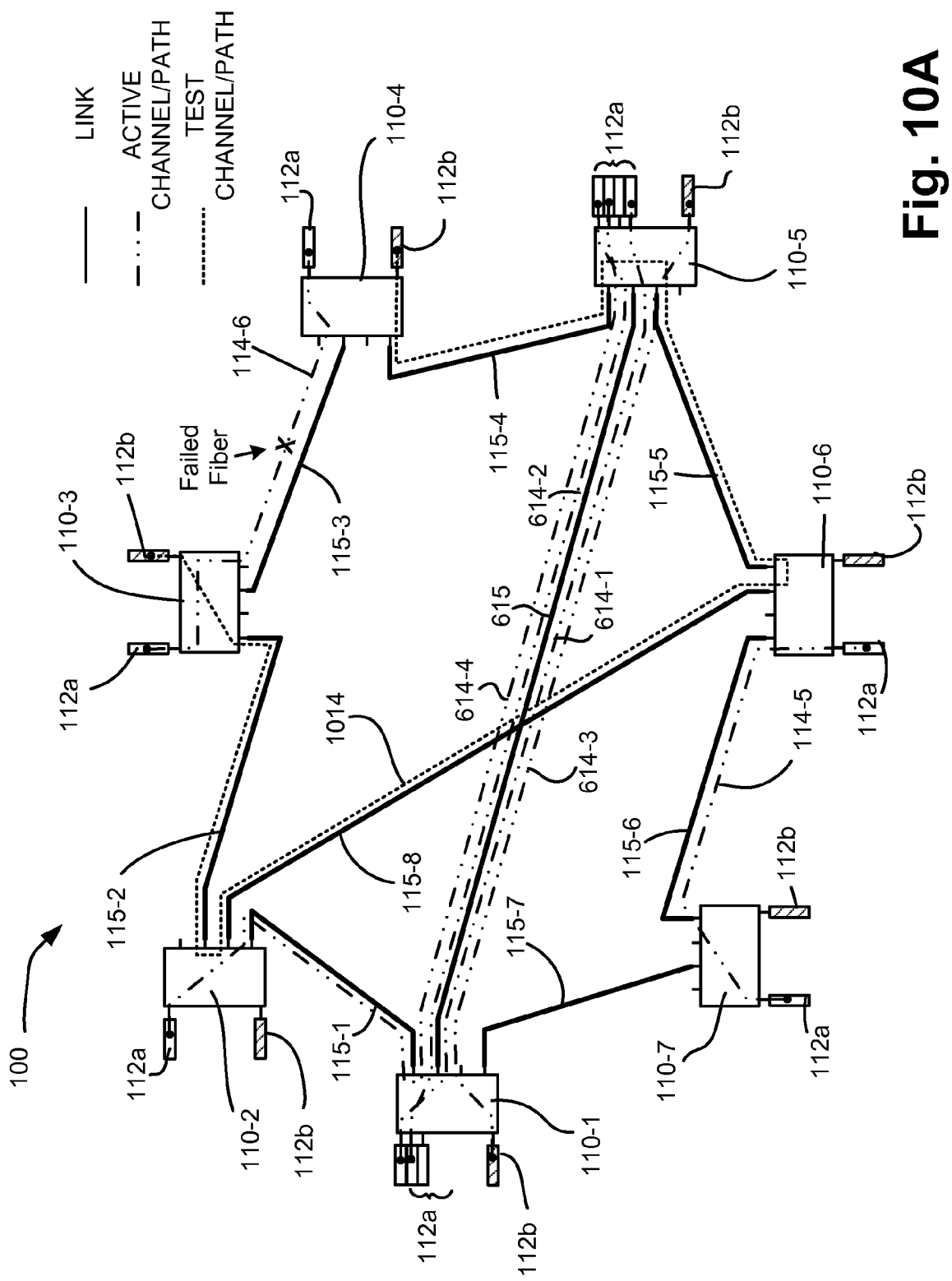
FIGS. 10A and 10B are diagrams illustrating a portion of the optical network of FIG. 1 consistent with another implementation.
Figure 10B:
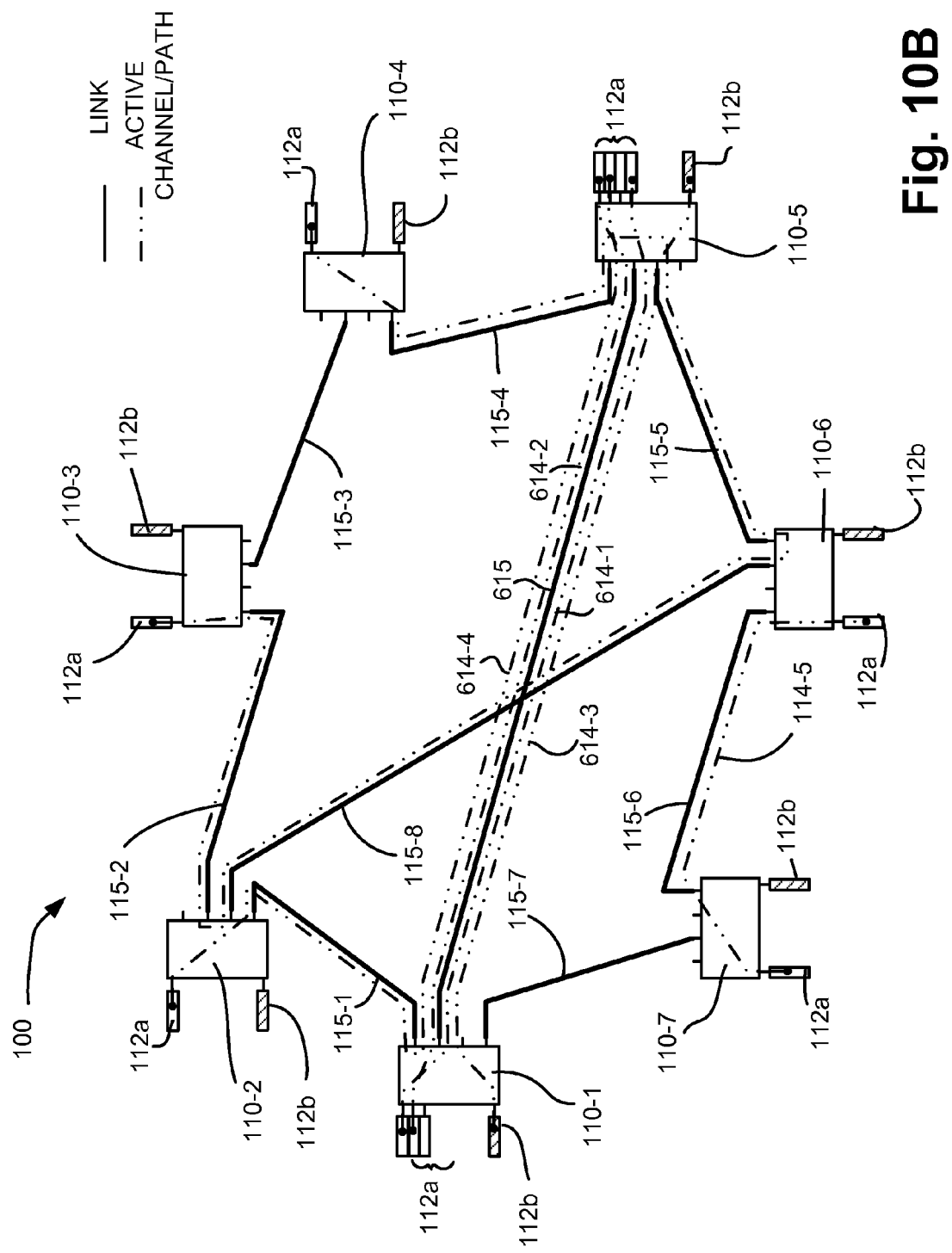
Figure 11:
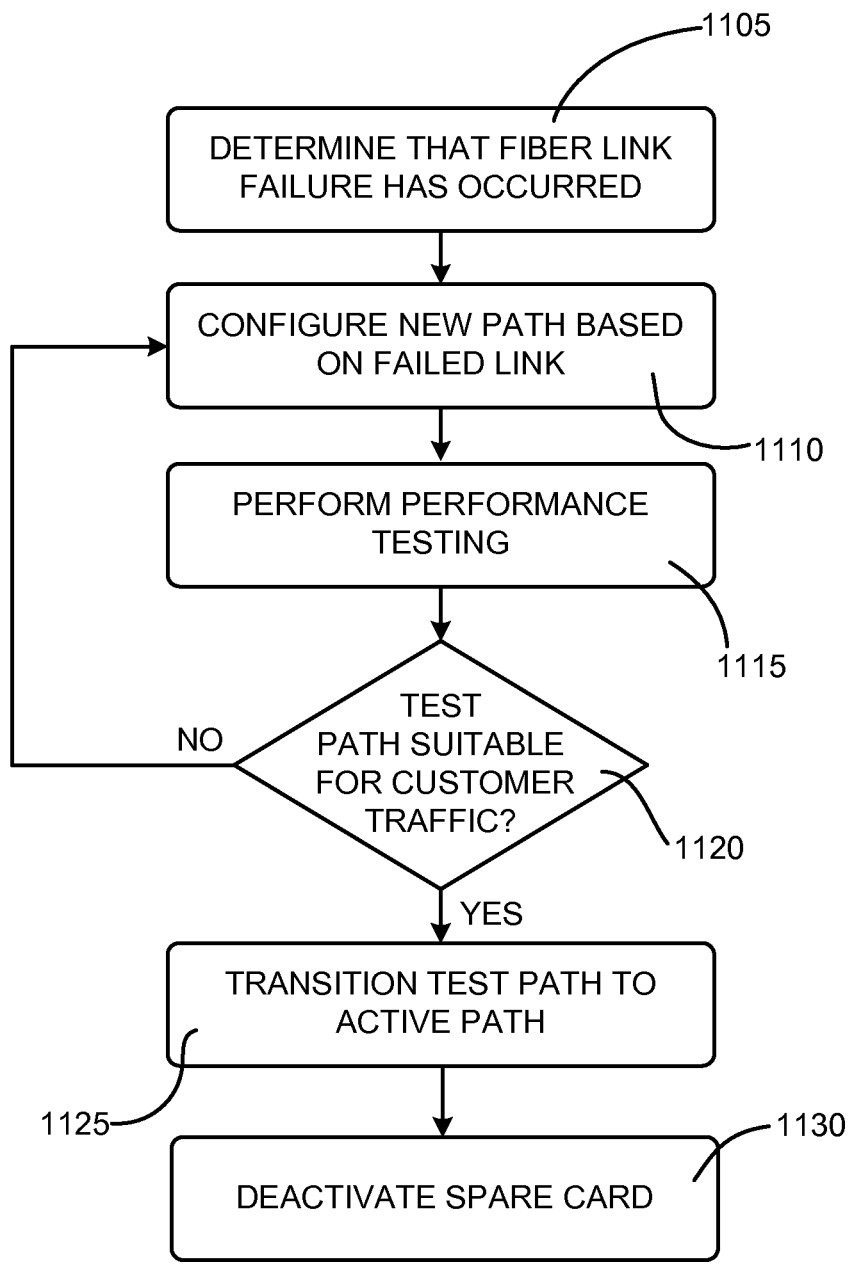
FIG. 11 is a flow diagram illustrating an exemplary process for protecting the optical network of FIG. 1 consistent with the embodiment of FIGS. 10A and 10B.

FIGS. 10A and 10B are diagrams illustrating a portion of network 100 consistent with a fiber-related failure. FIG. 11 is a flow diagram illustrating an exemplary process for protecting network 100 consistent with the embodiment of FIGS. 10A and 10B. For the purposes of this simplified example, assume fiber link 115-3 has failed, as depicted in FIG. 10A.

Processing may begin with network management system 125 determining that a fiber link failure has occurred (block 1105). Failure detection may be performed in a number of ways, such as optical port monitoring (e.g., via a photodetector), etc. When it is determined that a particular fiber link 115 has failed (e.g., link 115-3), as depicted in FIG. 10A, network management system 125 may configure a new path 1014 between spare card 112b in node 110-3 and spare card 112b in node 110-4 via nodes 110-2, 110-6, and 110-5 based on any light paths previously associated with the failed link, such as path 114-6 in this example (block 1110). For example, network management system 125 may identify/select an available path/channel in the fiber links 115 based on desired or required criteria, such as bandwidth, path length, etc.

Following configuration, performance testing of test path 1014 may be performed (block 1115). For example, network management system 125 may cause data traffic to be modulated (e.g., via a modulator 120) and transmitted via ROADM 135 in spare card 112b of node 110-3 via the selected path/channel. Performance metrics for the transmitted data may be analyzed to determine whether the selected channel path/channel provides an acceptable level of service to be implemented for customers of network 100 (block 1120). If it is determined that performance testing has determined that test path 1014 is not suitable for customer traffic (block 1120—NO), processing returns to block 1110 for identification/configuration of another available path/channel.

If the new path 1014 meets the required performance criteria (block 1120—YES), processing proceeds to block 1125. In block 1125, path 1014 is transitioned from a test path to an active path. For example, the configuration settings for spare cards 112b in nodes 110-3 and 110-4 relating to test path 1014 may be transferred or otherwise applied to the active cards 112a in nodes 110-3 and 110-4 previously associated with path 114-6, as depicted in FIG. 10B. At this point, the new light path is active for customer traffic and spare cards 112b may be deactivated (block 1130) until they are needed.

Although not depicted herein, in implementations in which multiple light paths travel over the failed link, the above processing may repeat for each path. For example, a first path may be characterized, tested, and transitioned using spare cards 112b, followed by the second path, etc. In some implementations, transitioning of paths may be based on ranking criteria, such as path bandwidth, customer identification, traffic averages, etc.

Figure 12:
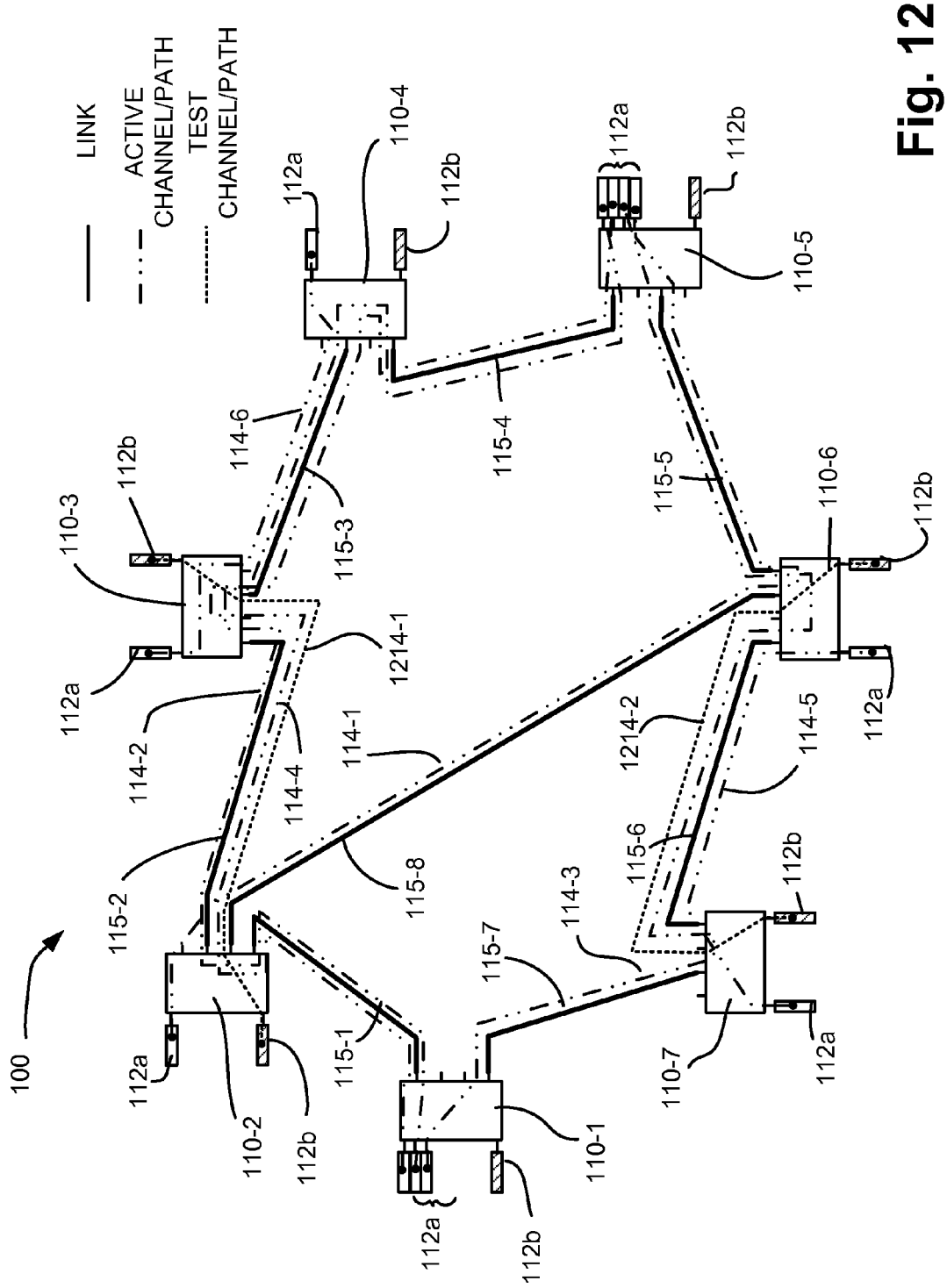
FIG. 12 is a diagram illustrating a portion of the optical network of FIG. 1 consistent with still another implementation.
Figure 13:
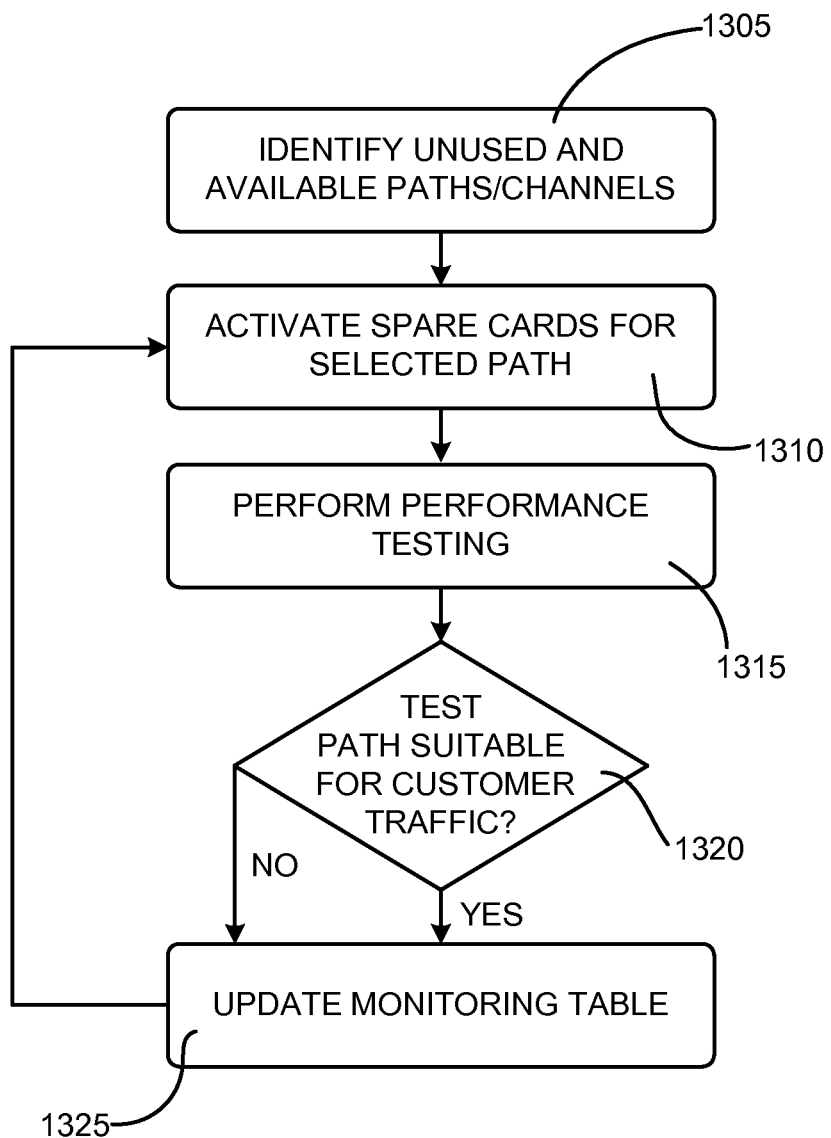
FIG. 13 is a flow diagram illustrating an exemplary process for monitoring unused paths in the network of FIG. 1 consistent with the embodiment of FIG. 12.

Consistent with still another embodiment described herein, spare cards 112b in nodes 110 may be used to monitor unused channels and/or paths in network 100, to ensure that the channels and/or paths are ready for future activation. For example, network management system 125 may monitor unused channels at predetermined time intervals or upon expiration of a particular time period, such as a monitoring time interval. FIG. 12 is a diagram illustrating a portion of network 100 consistent with a path monitoring feature. FIG. 13 is a flow diagram illustrating an exemplary process for monitoring unused paths in network 100 consistent with the embodiment of FIG. 12.

Processing may begin with network management system 125 identifying unused, yet available paths/channels in network 100 (block 1305). For example, network management system 125 may be configured to periodically execute a maintenance and monitoring application to identify available paths/channels in network 100. For the purposes of this example, assume that the network management system 125 has identified a test path 1214-1 between node 110-2 and node 110-3 and a test path 1214-2 between node 110-6 and node 110-7. Although depicted as singular paths/channels in FIG. 12, in some implementations test paths 1214-1 and 1214-2 may include multiple available channels for each link 115. Additionally, in some embodiments, identified paths may traverse multiple nodes 110, such as between node 110-2 and node 110-4.

Once one or more available network paths have been identified, network management system 125 may, for one of the identified test paths (e.g., paths 1214-1 or 1214-2), remotely activate spare cards 112b in the nodes 110 associated with the selected test path 1214 to send/receive for the selected test path 1214 (block 1310). For example, network management system 125 may activate spare cards 112b in nodes 110-2 and 110-3 for a particular channel.

Following configuration, network management system 125 may perform performance testing of the selected test paths 1214 (block 1315). For example, network management system 125 may cause data traffic to be modulated (e.g., via a modulator 120) and transmitted/received via ROADM 135 in spare cards 112b of nodes 110-2 and 110-3 via test path 1214-1. Performance metrics for the transmitted/received data may be analyzed to determine whether the selected test path 1214-1 provides an acceptable level of service to be implemented for customers of network 100 (block 1320). Alternatively, testing may be performed to determine a performance level associated with test path 1214-1. The results of the determination of block 1320 may be stored in a network monitoring table associated with network management system 125 (block 1325). Processing may then return to block 1310 for selection of another available path/channel (e.g., test path 1214-2).

Embodiments described herein relate to improving network efficiency in an optical network that includes a number of colorless, directionless, and contentionless ROADM nodes. More specifically, such ROADM nodes may include a card-based configuration including a number of active cards and an installed, but initially inactive spare card. Consistent with implementations described herein, a network management system may be configured to remotely, and in some cases automatically activate the installed spare cards on the ROADM nodes to enable various functionality, including network path characterization, optical path defragmentation, protection switching, and long term monitoring of network paths.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 5, 7, 9, 11, 13, the order of the blocks may be modified in other implementations. Further, non-dependent blocks may be performed in parallel. Additionally, with respect to other processes described in this description, the order of operations may be different according to other implementations, and/or operations may be performed in parallel.

An embodiment described herein may be implemented in many different forms. For example, a process or a function may be implemented as "logic" or as a "component." The logic or the component may include hardware (e.g., one or more processors, multi-core processors, etc.), as previously described.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method for managing an optical network having a plurality of nodes interconnected by a plurality of fiber links, comprising:
    configuring one or more active reconfigurable optical add/drop multiplexer (ROADM) cards installed into a node to pass optical traffic to and from the optical network; and
    remotely activating an installed, but not yet activated, spare ROADM card to pass optical traffic to and from the optical network, subsequent to configuring the one or more active ROADM cards, based on one of: an event or expiration of a time period.

2. The method of claim 1, wherein the active and spare ROADM cards comprise colorless, contentionless, and directionless ROADM cards.

3. The method of claim 2, wherein each of the one or more active ROADM cards are further configured to transmit or receive optical signals for a discrete light path through the optical network.

4. The method of claim 3, wherein the event comprises a request to characterize a new light path through the optical network.

5. The method of claim 4, further comprising:
    identifying a first test light path through the optical network to/from the spare ROADM card;
    activating the spare ROADM card for the test light path;
    testing of the first test light path to determine whether the first test light path meets performance requirements for the requested new light path; and
    transitioning the first test light path from the spare ROADM card to one of the active ROADM cards in the node when it is determined that the test light path meets performance requirements for the requested new light path.

6. The method of claim 5, further comprising:
    identifying a second test light path through the optical network to/from the spare ROADM card when it is determined that the first test light path does not meet the performance requirements for the requested new light path;
    activating the spare ROADM card for the second test light path; and
    testing of the second test light path to determine whether the second test light path meets performance requirements for the requested new light path.

7. The method of claim 3, wherein the event comprises a network fragmentation determination identifying two or more fragmented light paths to/from active ROADM cards in the node.

8. The method of claim 7, further comprising:
    activating a new fiber link through the optical network to/from the node;
    selecting a first of the two or more fragmented light paths;
    activating the spare ROADM card on a first new light path on the new fiber link based on the first selected light path;
    transitioning the first new light path from the spare ROADM card to the active ROADM card associated with the first selected light path;
    selecting a second of the two or more fragmented light paths;
    activating the spare ROADM card on a second new light path on the new fiber link based on the second selected light path;
    transitioning the second new light path from the spare ROADM card to the active ROADM card associated with the second selected light path; and
    repeating the selecting, activating, and transitioning for remaining fragmented light paths.

9. The method of claim 8, further comprising:
    testing each new light path to determine whether the new light path meets performance requirements associated with the corresponding fragmented light path; and
    performing the transitioning when it is determined that the new light path meets performance requirements associated with the corresponding fragmented light path.

10. The method of claim 8, wherein the transitioning further comprises deactivating the spare ROADM card.

11. The method of claim 8, further comprising:
    determining whether a second new light path on the new fiber link conflicts with an existing light path on the new fiber link;
    identifying an alternate second new light path on the new fiber link when the second new light path conflicts with an existing light path on the new fiber link;
    activating the spare ROADM card on alternate second new light path on the new fiber link based on the second selected light path; and transitioning the second new light path from the spare ROADM card to the active ROADM card associated with the second selected light path.

12. The method of claim 11, wherein determining whether a second new light path on the new fiber link conflicts with an existing light path on the new fiber link comprises:
   determining whether a channel associated with the second new light path conflicts with a channel associated with an existing light path on the new fiber link.

13. The method of claim 3, wherein the event comprises a failure of a particular active ROADM card, the method further comprising:
   activating the spare ROADM card to replace the failed active ROADM card.

14. The method of claim 3, wherein the event comprises a determination of a failure of a particular fiber link, the method further comprising:
   identifying a new light path through the optical network based on the failed fiber link;
   activating the spare ROADM card for the new light path;
   testing of the new light path to determine whether the new light path meets performance requirements; and
   transitioning the first test light path from the spare ROADM card to an active ROADM card associated with the failed fiber link when it is determined that the new light path meets performance requirements.

15. The method of claim 14, further comprising:
   repeating the identifying, activating, testing, and transitioning for each light path associated with the failed fiber link.

16. The method of claim 3, wherein the time period comprises a monitoring interval, the method further comprising:
   identifying one or more unused light paths associated with the node;
   activating the spare ROADM card for a selected one of the one or more unused light paths associated with the node;
   determining a performance level for the selected one of the one or more unused light paths; and
   storing information relating to the determined performance level in a monitoring table associated with the optical network.

17. The method of claim 1, wherein remotely activating the installed spare ROADM card comprising receiving commands from a network management system.

18. An optical node comprising:
   one or more active reconfigurable optical add/drop multiplexers (ROADM) elements; and
   one or more spare ROADM elements; and
   a processor to:
      configure the one or more active ROADM elements to pass optical traffic to and from an optical network; and
      receive remote instructions to activate the spare, but not yet active, ROADM element to pass optical traffic to and from the optical network, subsequent to configuring the one or more active ROADM elements, based on one of an event or expiration of a time period.

19. The optical node of claim 18, wherein the active and spare ROADM elements comprise colorless, contentionless, and directionless ROADM elements.

20. The optical node of claim 18, wherein the event comprises a network fragmentation determination identifying two or more fragmented light paths to/from active ROADM cards in the node, and wherein the processor is further configured to:
   activate a new fiber link through the optical network to/from the optical node;
   select a first of the two or more fragmented light paths;
   activate the spare ROADM element on a first new light path on the new fiber link based on the first selected light path;
   transition the first new light path from the spare ROADM element to the active ROADM element associated with the first selected light path;
   select a second of the two or more fragmented light paths;
   activate the spare ROADM element on a second new light path on the new fiber link based on the second selected light path;
   transition the second new light path from the spare ROADM element to the active ROADM element associated with the second selected light path; and
   repeat the selecting, activating, and transitioning for remaining fragmented light paths.

21. A system comprising:
   a plurality of optical fiber links;
   a plurality of optical nodes interconnected with the optical fiber links, the optical nodes comprising:
      one or more active reconfigurable optical add/drop multiplexers (ROADM) cards;
      one or more spare ROADM cards; and
      a processor to:
         configure the one or more active ROADM cards to pass optical traffic to and from an optical network; and
         receive remote instructions to activate at least one of the spare, but not yet active, ROADM cards to pass optical traffic to and from the optical network, subsequent to configuring the one or more active ROADM cards, based on one of an event or expiration of a time period; and
   a network management system operatively coupled to the plurality of optical nodes to transmit configuration instructions to the one or more active ROADM cards and the at least one of the spare ROADM cards in each of the plurality of optical nodes.

22. The system of claim 21, wherein the event comprises a failure of a particular active ROADM card in a particular optical node, wherein the network management system is configured to:
   determine that the particular active ROADM card has failed; and
   activate the at least one of the spare ROADM cards in the particular optical node to handle traffic previously handled by the failed particular active ROADM card.

* * * * *